US011436433B2

(12) United States Patent
Bachmutsky et al.

(10) Patent No.: US 11,436,433 B2
(45) Date of Patent: Sep. 6, 2022

(54) MALLEABLE FABRIC ATTACHED VIRTUAL ARTIFICIAL INTELLIGENCE (AI) TRAINING APPLIANCES

(71) Applicant: Intel Corporation, Santa Clara, CA (US)

(72) Inventors: Alexander Bachmutsky, Sunnyvale, CA (US); Kshitij A. Doshi, Tempe, AZ (US); Francesc Guim Bernat, Barcelona (ES); Raghu Kondapalli, San Jose, CA (US); Suraj Prabhakaran, Aachen (DE)

(73) Assignee: Intel Corporation, Santa Clara, CA (US)

( * ) Notice: Subject to any disclaimer, the term of this patent is extended or adjusted under 35 U.S.C. 154(b) by 1191 days.

(21) Appl. No.: 15/857,562

(22) Filed: Dec. 28, 2017

(65) Prior Publication Data

US 2019/0042884 A1    Feb. 7, 2019

(51) Int. Cl.
| | | |
|---|---|---|
| *G06K 9/62* | (2022.01) |
| *H04L 67/1097* | (2022.01) |
| *G06N 3/08* | (2006.01) |
| *H04L 67/125* | (2022.01) |
| *H04L 67/12* | (2022.01) |
| *H04L 67/10* | (2022.01) |
| *G06N 3/063* | (2006.01) |
| *H04W 4/38* | (2018.01) |

(52) U.S. Cl.
CPC .......... *G06K 9/6256* (2013.01); *G06N 3/063* (2013.01); *G06N 3/08* (2013.01); *G06N 3/082* (2013.01); *H04L 67/10* (2013.01); *H04L 67/1097* (2013.01); *H04L 67/12* (2013.01); *H04L 67/125* (2013.01); *H04W 4/38* (2018.02)

(58) Field of Classification Search
None
See application file for complete search history.

(56) References Cited

U.S. PATENT DOCUMENTS

| | | | | |
|---|---|---|---|---|
| 5,704,012 A * | 12/1997 | Bigus | .................... | G06F 9/5011 |
| | | | | 706/19 |
| 6,418,423 B1 * | 7/2002 | Kambhatla | .............. | G06N 3/10 |
| | | | | 706/15 |
| 10,157,333 B1 * | 12/2018 | Wang | .................. | G06F 16/5866 |
| 10,671,916 B1 * | 6/2020 | Sundararaman | ....... | G06N 20/20 |

(Continued)

*Primary Examiner* — Chris Parry
*Assistant Examiner* — Abderrahmen Chouat
(74) *Attorney, Agent, or Firm* — Hanley, Flight & Zimmerman, LLC

(57) ABSTRACT

An apparatus for training artificial intelligence (AI) models is presented. In embodiments, the apparatus may include an input interface to receive in real time model training data from one or more sources to train one or more artificial neural networks (ANNs) associated with the one or more sources, each of the one or more sources associated with at least one of the ANNs; a load distributor coupled to the input interface to distribute in real time the model training data for the one or more ANNs to one or more AI appliances; and a resource manager coupled to the load distributor to dynamically assign one or more computing resources on ones of the AI appliances to each of the ANNs in view of amounts of the training data received in real time from the one or more sources for their associated ANNs.

23 Claims, 11 Drawing Sheets

(56) References Cited

U.S. PATENT DOCUMENTS

| | | | |
|---|---|---|---|
| 2010/0169253 A1* | 7/2010 | Tan | G06F 9/5088 |
| | | | 706/21 |
| 2017/0220451 A1* | 8/2017 | Mankovskii | G06F 11/3664 |
| 2019/0130266 A1* | 5/2019 | Cao | G06N 7/005 |
| 2019/0332926 A1* | 10/2019 | Lie | G06F 9/30036 |
| 2020/0302292 A1* | 9/2020 | Tseng | G06N 3/08 |

* cited by examiner

MALLEABLE FABRIC ATTACHED VIRTUAL ARTIFICIAL INTELLIGENCE (AI) TRAINING APPLIANCES

FIELD

The present invention relates to the field of computing, and in particular to Artificial Intelligence (AI) training architectures provided in an edge gateway or switch of a network for edge computing.

BACKGROUND

It is noted that in coming Edge Cloud architectures unsupervised training will be one of the key workloads. Thus, different models may be trained in real time in Edge appliances, the training being fed by data sets coming from multiple Internet of Things (IoT) and Edge Cloud Devices. Thus, for example, these models may be fed by real time information. For example, models will incorporate into their construction data such as what users are buying in a given area and what is the instantaneous effect of traffic, advertising, weather, or their behavior.

DETAILED DESCRIPTION

Figure 1:
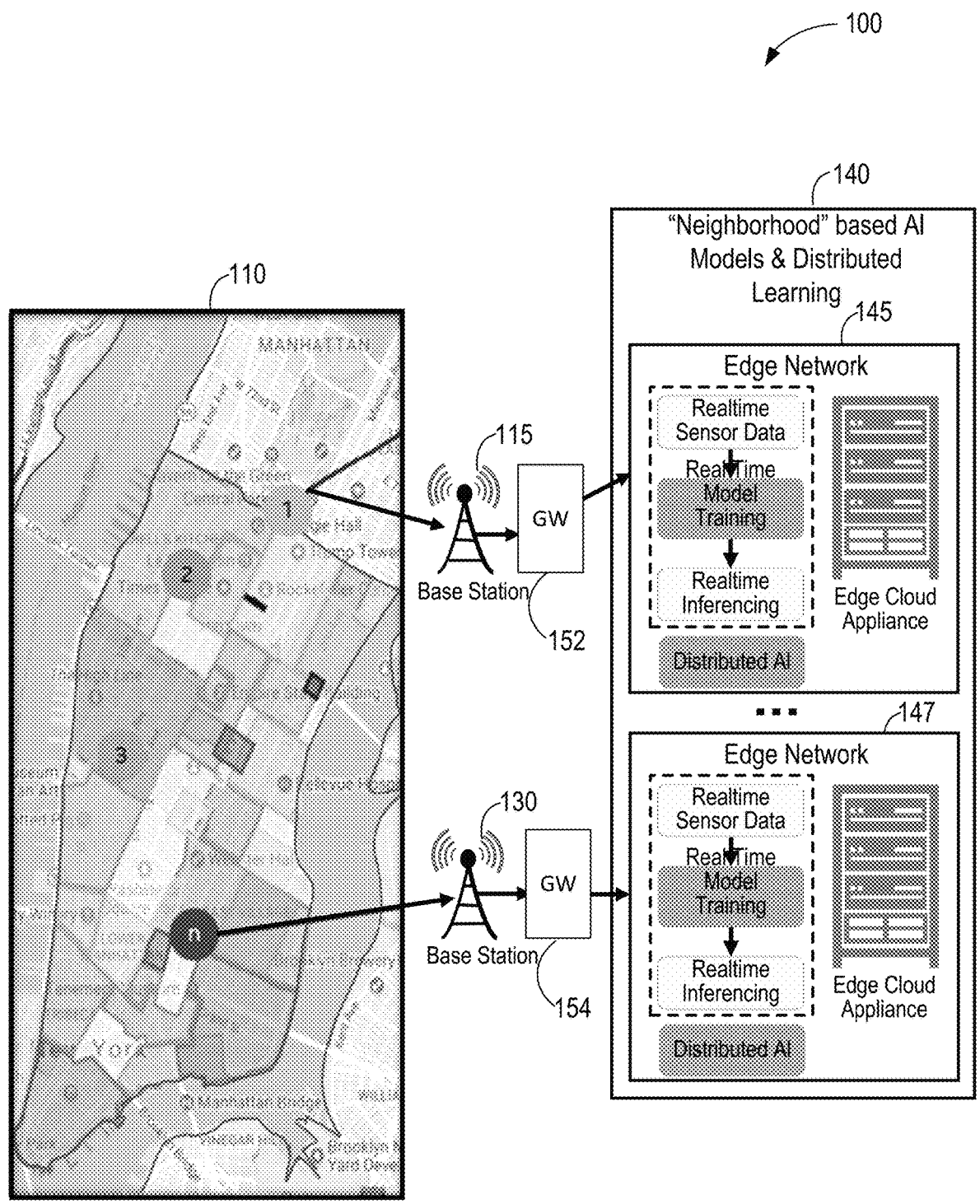
FIG. 1 illustrates an edge cloud with several edge network devices receiving training data from IoT or edge cloud devices disposed at several points in a metropolitan area having their AI models real time trained, in accordance with various embodiments.

In embodiments, an apparatus for training artificial intelligence (AI) models may include an input interface to receive in real time model training data from one or more sources to train one or more artificial neural networks (ANNs) associated with the one or more sources, each of the one or more sources associated with at least one of the ANNs, a load distributor coupled to the input interface to distribute in real time the model training data for the one or more ANNs to one or more AI appliances, and a resource manager coupled to the load distributor to dynamically assign one or more computing resources on ones of the AI appliances to each of the ANNs in view of amounts of the training data received in real time from the one or more sources for their associated ANNs.

In embodiments, the computing resources may include one or more processors or portions of processors disposed on the one or more AI appliances. In embodiments, the computing resources assigned to an ANN may include multiple processors and training of the ANN may be partitioned, by the apparatus, between the multiple processors.

In embodiments, the apparatus may be disposed in one of an edge gateway or a network switch, and the one or more sources of model training data may include Internet of Things (IoT) devices or edge clients. In embodiments, the apparatus may further include a client interface, to receive registration data from the one or more sources. In embodiments, the data from the sources may include ANNs that they respectively send data for, and details of construction for each ANN to be registered.

In embodiments, the apparatus may further include a traffic predictor to decide whether to increase or decrease the computing resources assigned to an ANN, based, at least in part, on the amount of training data received in real time, by the apparatus, for the ANN. In embodiments, the traffic predictor may decide whether to increase or decrease the computing resources based, at least in part, on a lookup table that correlates a level of resources with a level of training data received in real time for the ANN. Alternatively, the traffic predictor may decide whether to increase or decrease the computing resources based on an artificial intelligence based model that predicts future traffic volume for the ANN.

In embodiments, the traffic predictor may include a traffic monitor, coupled to the input interface and the traffic predictor, to monitor traffic volume from all of the sources associated with an ANN, and in those embodiments, the resource manager may further scale up or scale down the computing resources assigned to an ANN in response to directions received from the traffic predictor.

Additionally, in embodiments, the resource manager, prior to a scale up of computing resources to be assigned to an ANN, may further to identify additional available computing resources and register them with the load distributor. In embodiments, the apparatus may further include an ANN accumulator, coupled to the resource manager, to periodically collect versions of an ANN as trained on each of the computing resources assigned to the ANN, combine them into a composite version of the ANN, and store the composite version. Thus, in embodiments, the resource manager, prior to a scale down of computing resources that are assigned to an ANN, may collect a current version of the ANN from each of the computing resources to be removed and send the current versions to the ANN accumulator.

In embodiments, the one or more AI appliances may be provided in a chassis, and coupled to, for example, a hardware fabric interface (HFI) or network interconnect car (NIC), to provide an interface to tunnel communications between each AI appliance and the load distributor.

In the description to follow, reference is made to the accompanying drawings which form a part hereof wherein like numerals (or, as the case may be, the last two digits of an index numeral) designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Also, it is noted that embodiments may be described as a process depicted as a flowchart, a flow diagram, a dataflow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function. Furthermore, a process may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used hereinafter, including the claims, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may implement, or functions associated with the circuitry may be implemented by, one or more software or firmware modules.

As used hereinafter, including the claims, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

As used hereinafter, including the claims, the term "computing platform" may be considered synonymous to, and may hereafter be occasionally referred to, as a computer device, computing device, client device or client, mobile, mobile unit, mobile terminal, mobile station, mobile user, mobile equipment, user equipment (UE), user terminal, machine-type communication (MTC) device, machine-to-machine (M2M) device, M2M equipment (M2ME), Internet of Things (IoT) device, subscriber, user, receiver, etc., and may describe any physical hardware device capable of sequentially and automatically carrying out a sequence of arithmetic or logical operations, equipped to record/store data on a machine readable medium, and transmit and receive data from one or more other devices in a communications network. Furthermore, the term "computing platform" may include any type of electronic device, such as a cellular phone or smartphone, a tablet personal computer, a wearable computing device, an autonomous sensor, personal digital assistants (PDAs), a laptop computer, a desktop personal computer, a video game console, a digital media player, an in-vehicle infotainment (IVI) and/or an in-car entertainment (ICE) device, an in-vehicle computing system, a navigation system, an autonomous driving system, a vehicle-to-vehicle (V2V) communication system, a vehicle-to-everything (V2X) communication system, a handheld messaging device, a personal data assistant, an electronic book reader, an augmented reality device, and/or any other like electronic device.

As used hereinafter, including the claims, the term "link" or "communications link" may refer to any transmission medium, either tangible or intangible, which is used to communicate data or a data stream. Additionally, the term "link" may be synonymous with and/or equivalent to "communications channel," "data communications channel," "transmission channel," "data transmission channel," "access channel," "data access channel," "channel," "data link," "radio link," "carrier," "radiofrequency carrier," and/or any other like term denoting a pathway or medium through which data is communicated.

As used hereinafter, including the claims, the term "artificial neural network (ANN)" may refer to any type of artificial neural network, standard or specialized, including convolutional neural networks (CNNs), deep neural networks (DNNs), or the like. An ANN may be based on a collection of connected units or nodes called artificial neurons that are analogous to biological neurons in an animal brain. Each connection, analogous to a synapse, between artificial neurons may transmit a signal from one to another. The artificial neuron that receives the signal may process it and may then signal artificial neurons connected to it.

As used hereinafter, including the claims, the terms "module", "input interface" "AI model", "artificial neural network (ANN)", "deep ANN", "load distributor", "resource manager", "traffic monitor", "traffic predictor", "models accumulator", "configuration and management module", "virtual AI appliance", "AI appliance", "hardware fabric interface", and "tunneling interface" may refer to, be part of, or include one or more Application Specific Integrated Circuits (ASIC), electronic circuits, programmable combinational logic circuits (such as field programmable gate arrays (FPGA)) programmed with logic to perform operations described herein, a processor (shared, dedicated, or group) and/or memory (shared, dedicated, or group) that execute one or more software or firmware programs generated from a plurality of programming instructions with logic to perform operations described herein, and/or other suitable components that provide the described functionality.

FIG. 1 illustrates an exemplary edge cloud with edge cloud appliances having their AI models real time trained, in accordance with various embodiments. As noted above, it is expected that in coming Edge Cloud architectures, for example, Mobile Edge Cloud architectures or various other architectures, unsupervised training may be one of the key workloads. As shown in FIG. 1, different models may be trained in real time in various edge cloud appliances, the training being fed by data sets coming from multiple IoT and Edge Cloud Devices. Thus, with reference to FIG. 1, a map of Manhattan, New York City is shown, as an example of a metropolitan area. There are N sources of data coming from various locations in Manhattan, shown in FIG. 1 as "1", "2", "3" and "n". Each of them may send model training data, such as, for example, sensor data, or other data, relevant to one or more models, to a local base station of a telecommunications network, which may, for example, provide the received data to an edge network device, such as an edge cloud appliance. The collection of such AI models, as provided in various edge cloud appliances is shown in FIG. 1 as Neighborhood based AI Models and Distributed Learning 140. Example models are described in more detail below, in connection with FIG. 3.

In embodiments, the models may be fed by real time information coming from these various sources, such as, for example, what users are buying in a given area, and may be trained to infer what the instantaneous effect of traffic, or advertising, or weather, may be on their purchasing behavior. One of the challenges in real time edge cloud scenarios may be how to quickly and dynamically adapt a training architecture, i.e., how many platform resources to provide to the models, based on changes on the amount of data coming from the edge clients as well as priorities of training models being executed in these edge platforms.

Continuing with reference to FIG. 1, IoT source 1, for example, may send model training data to base station 115. Base station 115 may forward the data from IoT source 1, via gateway or switch 152 to Edge Network device 145, which may be collocated with base station 115, or close by. Similarly, IoT source "n" may send model training data to base station 130, which in turn may forward the data from IoT source "n", via gateway or switch 154 to Edge Network device 147, which may be collocated with Base Station 130, or close by.

In embodiments, the model training data from IoT source "n" may be for the same model as the model training data from IoT source 1. This may occur, for example, with regard to a traffic inferencing AI model, which may seek to learn how to direct computer assisted or autonomous driving (CA/AD) vehicles to proceed. Such models are improved by processing data from several intersections and roadways in detail, each set of such detailed "local knowledge" subsequently integrated into the global model. Or, for example, the model training data from IoT source "n" may be different than the model training data from IoT source 1, and they each may be used by different models altogether, such as, for example, one training on geotagged shopping behavior and another on geotagged navigation requests from smartphone users.

Alternatively, a single model may incorporate into its construction multiple streams of data so as to learn predictors and co-dependencies. For example, what users may be buying in a given geographic area and what the instantaneous effect of traffic, advertising (both generally and in nearby signage or in store kiosks or promotions), or weather, on their buying behavior.

Thus, in embodiments, various AI models may be "neighborhood based", i.e., versions of them may be provided and trained on multiple edge cloud appliances provided at the periphery of a core network. Then current versions of the AI models may periodically be collected at each edge cloud appliance and integrated, such that every edge cloud appliance is provided with the latest "integrated' version of each relevant model. In this manner, in embodiments, AI model learning may be distributed.

Regardless of the AI models the Edge Cloud Appliances of Edge Networks 145 and 147 had to be trained, in embodiments, as will be described in more detail below, gateways or switches 150 and 152 may be configured with the real time AI model training technology of the present disclosure to allow the AI models on the Edge Cloud Appliances of Edge Networks 145 and 147 to be efficiently real time trained.

Figure 2:
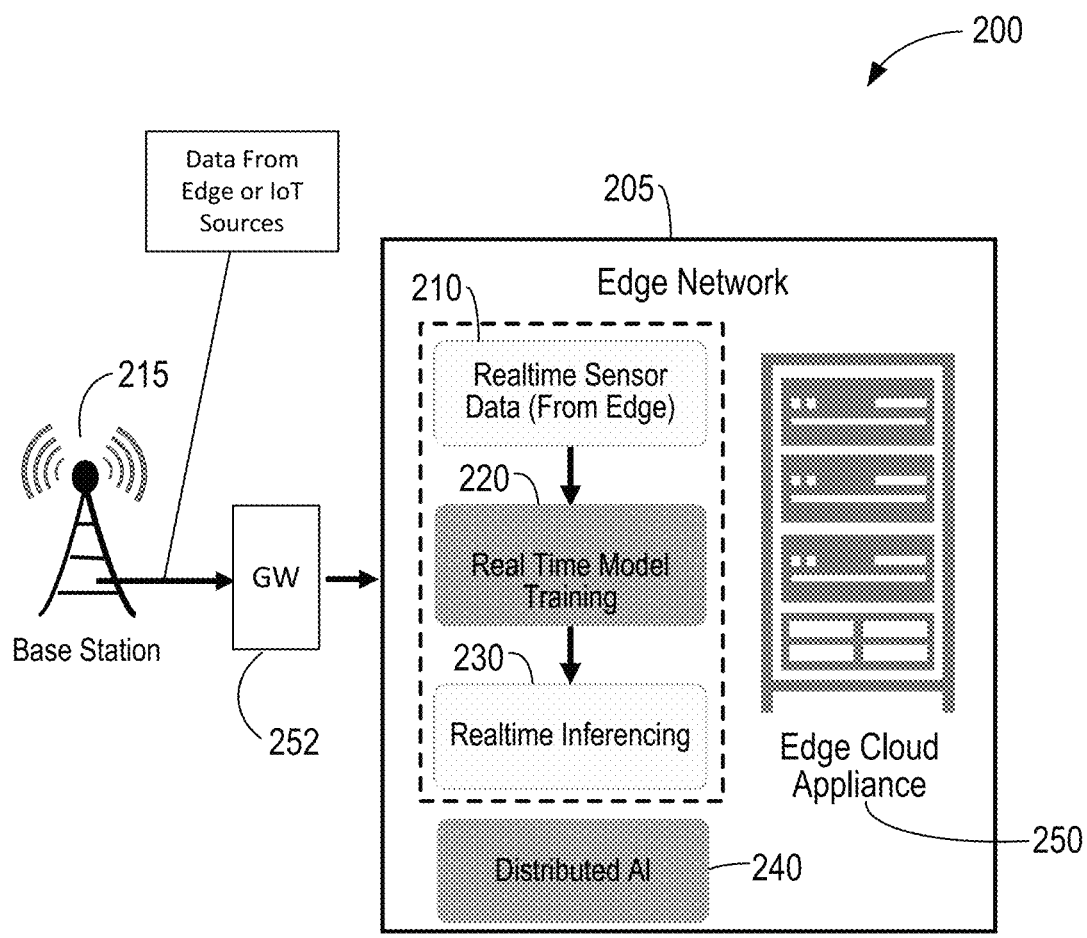
FIG. 2 illustrates detail of an example edge network device shown in FIG. 1, in accordance with various embodiments.

FIG. 2 illustrates detail of an example Edge Network device shown in FIG. 1, namely Edge Network device 205, which may receive data from Base Station 215, according to various embodiments. As shown, Base Station 215 may forward model training data from Edge or IoT sources, via gateway or switch 252 to Edge Network device 205. For example, Base Station 215, as shown in FIG. 1 (therein labeled "Base Station 115"), may receive data from IoT source "1" located in midtown Manhattan, New York City. With reference to FIG. 2, Edge Network device 205 may include Edge Cloud Appliance 250. Edge Network device 205 may receive and process Realtime Sensor Data 210, which may be received, via an input interface, via Base Station 215. The sensor data may be used by Real Time Model Training 220 to train one or more AI models.

Figure 3:
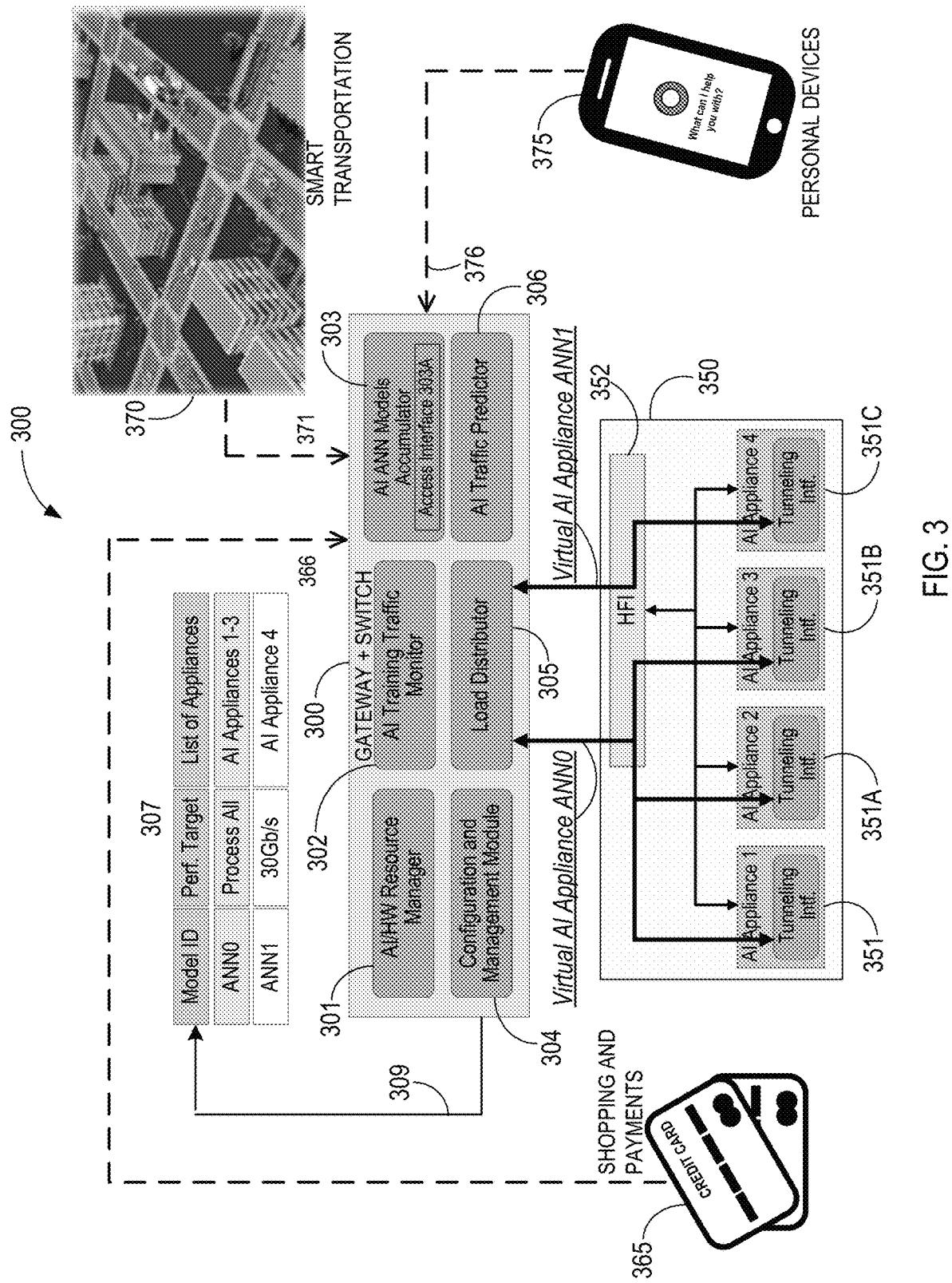
FIG. 3 details of an example AI training architecture with three example data sources, in accordance with various embodiments.

Additionally, local versions of one or more AI models disposed in Edge Cloud Appliance 250, may, even while being further trained, perform Realtime Inferencing 230. For example, a model may be operating in Edge Network device 205 that provides navigation decisions, or information to inform such decisions, to CA/AD vehicles in its vicinity. The model may be trained on an ongoing basis, using Realtime Sensor Data 210, to more and more accurately provide navigation information to CA/AD vehicles, such as by more accurately inferencing traffic patterns or incipient congested areas. At the same time, it may continue to provide such inferencing to users. As noted above, the local versions of the various AI models being trained at Edge Network device 205, may be later collected and integrated with other versions of the same respective models from other Edge Cloud Appliances, on other Edge Network devices such as, for example, shown collectively in Neighborhood based AI Models and Distributed Learning 140 of FIG. 1. Thus, Edge Network device 205 includes Distributed AI 240. FIG. 3 depicts a detailed implementation for an Edge Network device, in accordance with various embodiments.

It is here noted that one possible approach to achieving scale-out across multiple hardware units involves using a software based scale-out of a model training task. In this approach, a certain number of CPUs may act as task distributors, where each task acts on a chunk of training data. Thus, in this software based approach, an AI device may be managed from CPUs in a platform in which the AI device is hosted. One of the CPUs in the cluster of such platform may act as a special kind of task distributor or coordinator, which may divide time into intervals, and, at the end of each interval, collect intermediate training results, or updates from a previous interval, integrate them into a single model, and then redistribute the integrated model among the scale-out nodes of the model for the next interval.

In such a software based scale-out implementation there is a need to communicate data and training results, as well as to coordinate the starting and stopping of model training operations on a given AI device at the boundaries of each iteration. Thus, computing overhead is required due to the fact that such various exchanges at each iteration boundary need to go through multiple rounds of data copying, transport stack execution, house-keeping activities, synchronization steps, and check pointing of intermediate results. Other drawbacks from such software brokered training may include software stack complexity as well as the fact that computing elements may be underutilized while tied up in the role of distributing tasks and accumulating models. Moreover, once AI training is partitioned according to one strategy, it may take time to repartition and reorganize the training part-way through, which limits flexibility in recalibrating when conditions or requirements change.

Thus, in contrast to a software based scale out across multiple hardware units, as described above, embodiments of the present disclosure may provide higher flexibility without higher computing overhead. In embodiments, a network attached pool of AI resources may function as virtual "scaled-up" appliances. In embodiments, capacity scale-up may be achieved "behind the scenes", so to speak, by partitioning training work into pieces that may then be executed on variable numbers of physical AI resources that are dynamically composed.

It is noted that because AI models such as Artificial Neural Networks (ANNs) are highly data parallel as well as task parallel, in embodiments, their training may be performed by partitioning or tiling work and data according to device capacity. Thus, for example, for training N instances of training of Model ID A may be used. As a result, in embodiments, one may schedule training data to model A to any of these N instances using high level criteria, for example, round robin between the instances. Moreover, because typical training tasks are coarse-grained, so that the allocation of physical appliances to the construction of delta-ANNs does not require fine-grain scheduling, in embodiments, steering of traffic among different subtasks may be achieved with low complexity and low hardware overhead. Thus, in embodiments, such a virtualized scale-up/scale-down AI capability may be presented as one uniform AI device to the compute sleds, and an example network between the compute sleds and the AI resources is virtualized from the point of view of a requesting client stack. Thus, in embodiments, (virtual) ANN models may be registered with their associated performance and priority attributes, thereby removing any complexity for clients, and aggregated automatically within the architecture itself.

In embodiments, as training data is received from IoT or Edge Clients (collectively referred to herein as "clients"), it may be sent to the AI appliances then associated with the particular AI model. In embodiments, an AI model may be an ANN, and in what follows the AI model will be described as an ANN. In embodiments, adaptive logic, based on traffic monitoring as well as traffic prediction, may provide elastic throughput and the ability to reapportion capacities for each ANN to be trained. In embodiments, partial results may be periodically accumulated and integrated, and may then be redistributed behind the virtual ANN (vANN) interface. This removes the need for any software based scale-out, coordination or communication.

Thus, in embodiments, a disaggregated pool of AI appliances may be connected to an edge gateway entity or apparatus that arbitrates capacity allocation between the pool and requesting clients. In embodiments, the entity or apparatus may include a client interface by which clients may register ANN models, including a specification as to which client will be sending data for which ANN, and the various details of the ANN's construction. Thus, to a client, AI appliance capacity for training an ANN does not appear bounded by actual physical capacity of individual devices within the pool of AI appliances. Instead, a client may specify a "virtual" ANN that may then be realized on a dynamically composed network of devices in the pool, which may be scaled up or down over time as a function of data volume and other considerations, as described more fully below. Thus, in embodiments, an example AI training architecture may dynamically add or remove training capacity (i.e., number of AI appliances, or portions of AI appliances, associated with the vANN). Thus, the effective capacity of the pool for each given ANN to be trained is malleable.

In embodiments, capacity adjustments may be determined based on a desired level of performance for each vANN, computing resources then available, size/complexity of the model, and rate of incoming training data for that model. In embodiments, the desired level of performance may be explicitly set by a software stack that registers the model (in-band), or alternatively, it may be separately set via a management module (out-of-band). Similarly, the desired level of performance may be dynamically altered through similar in-band or out-of-band requests. In embodiments, Table 307 of FIG. 3 may maintain, for example, a list of performance targets for each vANN managed by an exemplary architecture or apparatus.

In embodiments, once a vANN is set up for training, it may receive inputs from client(s). These inputs may be steered towards different physical appliances according to a partitioning imposed on the vANN model by an Edge/Gateway entity or apparatus. Moreover, in embodiments, software residing on AI ANN Accumulator 303 of FIG. 3 may be furnished with mechanisms that allow it to extract a model at any then current stage of training. This may be done, for example, by periodic aggregation of parts of the model training that have been assigned to different physical appliances. For example, in embodiments, AI ANN Accumulator 303 may add weights from two different ANNs that have been training in parallel for the same model. Thus, in embodiments, if there is a model, Model A, having an ANN with two layers and three neurons total, one may train the weights on the three neurons for the two ANNs and then at some point create one single ANN adding the weights 1 to 1 of the two neurons.

Thus, a client need not be cognizant of how a given training task for a given model has been split into smaller tasks or models, each of which may be assigned to different physical appliances in the drawer by the apparatus.

FIG. 3 illustrates details of an example AI training architecture with three example data sources, in accordance with various embodiments. With reference thereto, the AI training architecture may include two blocks, gateway and switch block 300 and drawer/platform/chassis block 350 having a plurality of appliances 351-351C. Gateway and switch block 300 may be one of gateway or switch 152 or 154 or FIG. 1, while AI appliances 351-351C may be the Edge Cloud Appliances of Edge Networks 145 and 147 FIG. 1. For ease of description, in what follows, drawer/platform/chassis block 350 may simply be referred to as "AI Platform Drawer 350."

Continuing with reference to FIG. 3, training data from three different sources is being sent to the depicted example AI training architecture. These sources include shopping and payments data 365, sent to the AI training architecture along link 366, smart transportation data 370, sent to the AI training architecture along link 371, and personal devices data 375, sent to the AI training architecture along link 376. It is noted that personal devices data may include, for example, gaming data, geotagged interactivity data, such as data relating to navigation requests and activity, data relating to points of interest requests, data relating to mass transit system route requests, or other such data.

Continuing with reference to FIG. 3, in what follows, Gateway and Switch block 300 and its various components will be first described, followed by a description of AI platform drawer 350 and its components. With reference to FIG. 3, Gateway and Switch block 300 may include AI Load Distributor 305, AI Training Traffic Monitor 302, AI Traffic Predictor 306, AI/HW Resource Manager 301, AI ANN Models Accumulator 303 and Configuration And Management Module 304. These are next described in that order.

Continuing with reference to FIG. 3, in embodiments, AI Load Distributor 305 may distribute incoming traffic for a virtual ANN model (vANN) among the one or more AI appliances provided in AI platform drawer 350 that are associated with that vANN at a given point in time. Thus, for example, in FIG. 3 there are two vANNs shown, Virtual ANN Appliance ANN0 and Virtual ANN Appliance ANN1. As may be seen, ANN0 is assigned to AI appliances 1, 2 and 3, while ANN1 is assigned, at this point in time, only to AI Appliance 4.

In embodiments, AI Training Traffic Monitor 302 may monitor the volume of traffic from client(s) to a given vANN per unit of time. AI Training Traffic Monitor 302 may further store average values, N average values (moving averages), $90^{th}$ percentile statistics, and/or any other metrics or conditions that may be used to decide whether or when to increase or decrease physical resources to associate with an ANN.

In embodiments, AI Traffic Predictor 306 may use information provided by AI Traffic Training Monitor 302 to decide when, and by what amount, to increase or decrease the physical resource strength of vANN. In simple embodiments, it may just use a policy or a lookup table. In alternate more complex embodiments, it may implement an AI model of its own to predict traffic patterns for a vANN being trained. In embodiments, when a such a change of resources is needed, AI Traffic Predictor 306 may implement the change in combination with AI/HW Resource Manager 301, next described.

In embodiments, AI/HW Resource Manager 301 may scale-up or scale-down the physical appliance capacity for a vANN as directed by AI Traffic Predictor 306. In embodiments, when scaling up, it may first identify the appliances that may be added to a vANN. Then, once it identifies the available appliances, it may register them as being for a given vANN, thereby exposing them to AI Load Distributor 305. If scale-up capacity as requested by AI Traffic Predictor 306 is not immediately available, in embodiments, AI/HW Resource Manager 301 may allocate capacity that is available, and defer adding additional capacity until a later time.

Conversely, when scaling down, AI/HW Resource Manager 301 may first collect the current ANN delta model then stored each of the appliances selected for detaching from a given vANN. It may then send the delta models to AI ANN Models Accumulator 303 (next described), then detach the AI appliance(s) being removed, and then inform Load Distributor 305. It is noted that Table 307 is an example of dynamic state and configuration that results from the management of AI/HW Resource Manager 301. As may be seen, in embodiments, Table 307 may list the AI Appliances assigned to each vANN, and may further list a performance target for each vANN. The performance target may be used in determining resources to assign to the vANN, in embodiments.

In embodiments, AI ANN Models Accumulator 303 may, periodically, for example every K units of time as configured for each vANN, may collect all the different delta models that may have been trained on an assigned set of physical resources, e.g., AI Appliances 351-351B for vANN0, and aggregate them into a current model for that vANN. Additionally, AI ANN Models Accumulator 303 may include an interface by which software can access the current accumulated or aggregated model. In embodiments, this may be Access Interface 303A.

Finally, in embodiments, Configuration And Management Module 304 may provide for administrative access by which policies may be set and for configuring both the Gateway and Switch 300 resources, as well as resources in AI Platform Drawer 350.

Turning now to AI Platform Drawer 350, in embodiments, AI Platform Drawer 350 may include a variable number of AI devices or appliances, including AI Appliances 351-351C. In embodiments, AI Appliances 1-4, 351-351C, may be implemented, for example, as Intel® Lake Crest chips, running the Intel® Nervana™ platform, or, for example, using any other AI processing chip or device, running any platform, or any combination of them, as may be appropriate. Thus, in embodiments, AI Appliances 351-351C may be training instances of any appropriate type.

In embodiments, AI Platform Drawer 350 may include Hardware Fabric Interface (HFI) 352, a fabric host interface for communications between AI Platform Drawer 350 and the various components in Gateway and Switch 300, through which data and control packets can be routed to the individual AI Appliances 351-351B provided in AI Platform Drawer 350 and their respective tunneling interfaces, as shown. It is noted that in alternate embodiments, for example, instead of HFI 352, a network interconnect car (MC) may be used instead (especially in Ethernet scenarios). In embodiments, these interfaces may be used to tunnel communications between the components of Gateway and Switch 300 that manage vANN resources and load distribution among the AI Appliances that may be assigned to each vANN. In embodiments, such tunneling removes the need for a software or protocol intermediary to bridge between the fabric protocol and the private protocol between Gateway and Switch 300 and AI Platform Drawer 350. Thus, in embodiments, for example, communication between different training instances may be implemented using protocols implemented on top of Layer 5 (application layer) or, for example, in alternate embodiments, the fabric or Ethernet L4 protocols may be changed.

Figure 4:
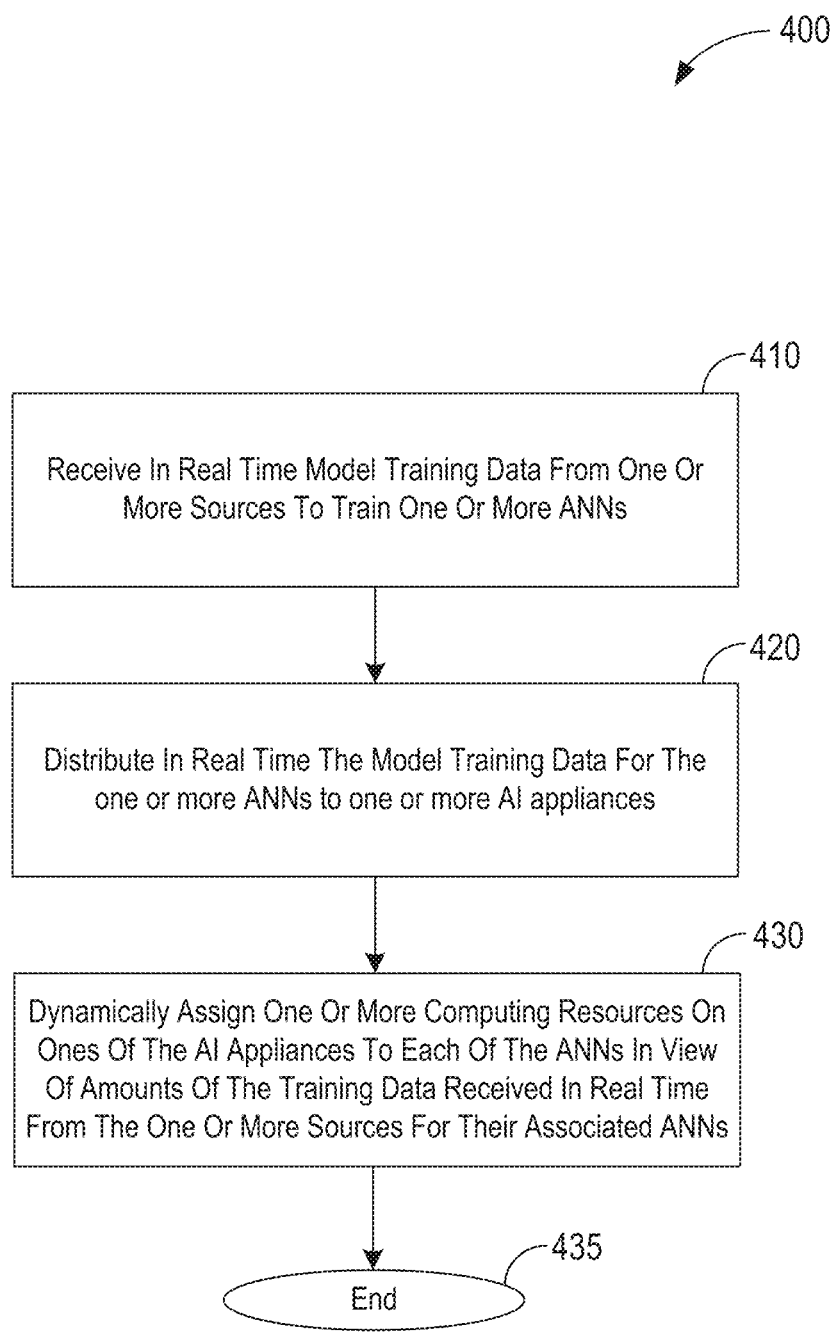
FIG. 4 illustrates an overview of the operational flow of an example process for receiving real time model training data in accordance with various embodiments.

Referring now to FIG. 4, an overview of the operational flow of an example process for receiving real time model training data in accordance with various embodiments is presented. Process 400 may be performed by apparatus such as Gateway and Switch 300 of FIG. 3, according to various embodiments. Process 400 may include blocks 410 through 435. In alternate embodiments, process 400 may have more or less operations, and some of the operations may be performed in different order.

Process 400 may begin at block 410, where an example apparatus may receive in real time model training data from one or more sources to train one or more ANNs on one or more Edge Cloud Appliances or simply, edge devices. For example, the one or more sources may be data sources shopping and payments 365, smart transportation 370 and personal devices 375, whereas the edge devices may be AI appliances 351-351C, as shown in FIG. 3. Moreover, the one or more ANNs may include ANN0 and ANN1 as shown in FIG. 3. From block 410, process 400 may proceed to block 420, where the example apparatus may distribute in real time the model training data for the one or more ANNs to one or more AI appliances. For example, the example apparatus may be Gateway and Switch 300 of FIG. 3, and in particular, Load Distributor 305.

From block 420, process 400 may proceed to block 430, where the example apparatus may dynamically assign one or more computing resources on ones of the AI appliances to each of the ANNs in view of amounts of the training data received in real time from the one or more sources for their associated ANNs. In embodiments, this may occur, for example, when incoming training data traffic significantly changes, thereby requiring a dynamic response from the example apparatus. In embodiments, this may be performed by AI/HW Resource Manager 301 as directed by AI Traffic Predictor 306, based on traffic volume measurements made by AI Training Traffic Monitor 302, all as shown in FIG. 3. From block 430, process 400 may proceed to block 435, where it may terminate.

Figure 5:
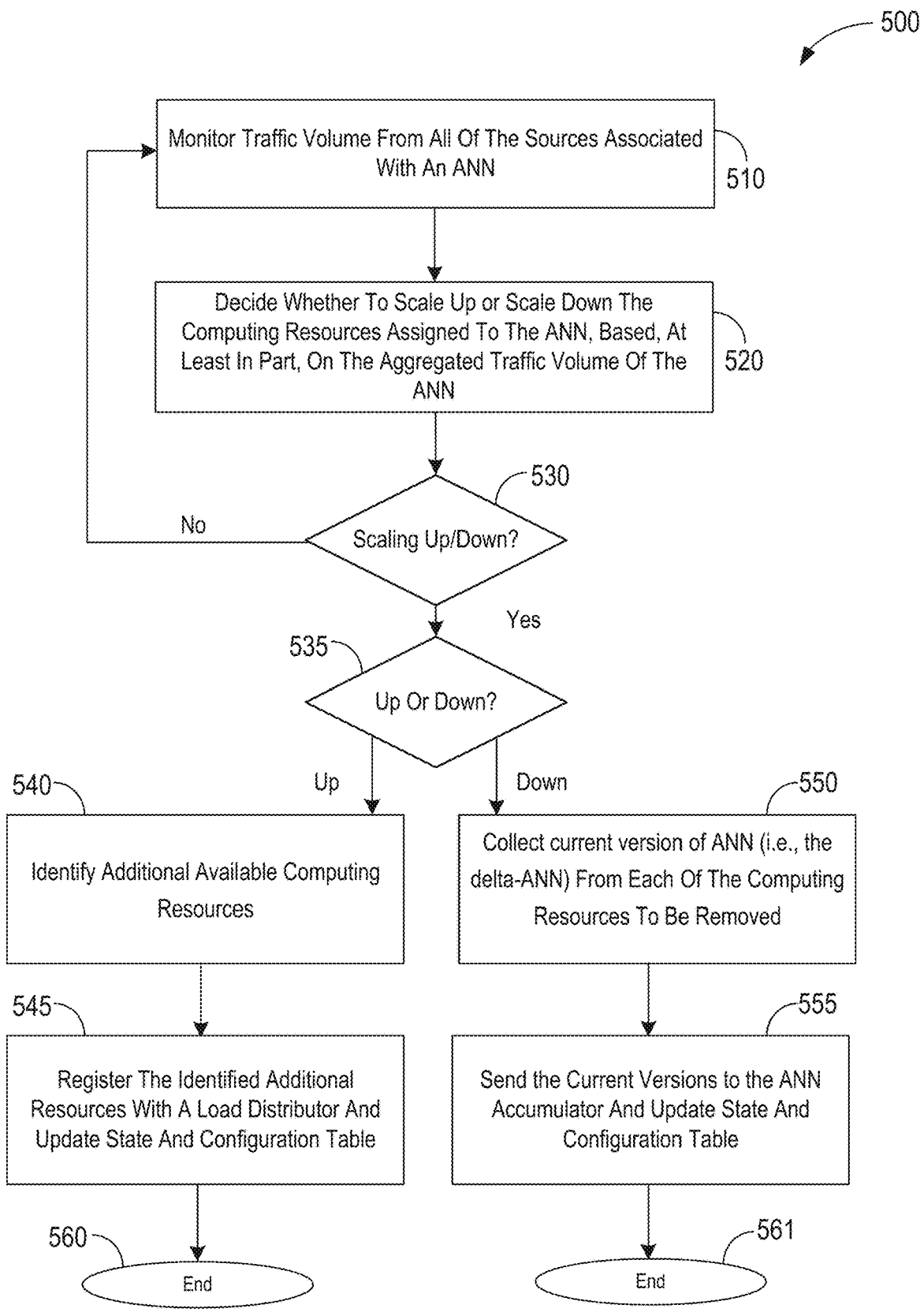
FIG. 5 illustrates an overview of the operational flow of an example process for monitoring traffic volume from all data sources associated with an ANN and dynamically scaling resources assigned the ANN, in accordance with various embodiments.

Referring now to FIG. 5, an overview of the operational flow of an example process 500 for monitoring traffic volume from all data sources associated with an ANN and dynamically scaling resources assigned the ANN, in accordance with various embodiments is presented. Process 500 may be performed by apparatus such as the Gateway and Switch 300 block of the example apparatus depicted in FIG. 3, in particular by some of its components, according to various embodiments. Process 500 may include blocks 510 through 561. In alternate embodiments, process 500 may have more or less operations, and some of the operations may be performed in different order.

Process 500 may begin at block 510, where an example apparatus may monitor traffic volume from all of the sources associated with an ANN. For example, this may be performed by AI Training Traffic Monitor 302, of Gateway and Switch 300 of FIG. 3. From block 510, process 500 may proceed to block 520, where the example apparatus may decide whether to scale up or scale down the computing resources on an AI appliance assigned to the ANN, based, at least in part, on the aggregated traffic volume of the ANN. For example, in embodiments, this may occur when incoming training data traffic changes, thereby requiring a dynamic response from the example apparatus. In embodiments, this may be performed by AI/HW Resource Manager 301 as directed by AI Traffic Predictor 306, based on traffic volume measurements made by AI Training Traffic Monitor 302, all as shown in FIG. 3.

From block 520, process 500 may proceed to query block 530, where it may be determined if, in fact, it has been decided to change the resources assigned to the ANN. If "No" at query block 530, then process flow may return to block 510, where traffic volume received may be monitored as described above. However, if "Yes" at query block 530, then process flow may proceed to query block 535, where it may be determined if, in fact, the change in resources assigned to the ANN is a scaling up or a scaling down.

If "Up" at query block 535, and additional resources are to be assigned to the ANN, then process flow may proceed to block 540, where the example apparatus may identify additional available computing resources. In embodiments, this may be performed by AI/HW Resource Manager 301 of Gate and Switch 300 of FIG. 3. From block 540, process 500 may proceed to block 545, where it may register the identified additional computing resources with a load distributor and update a state and configuration table. In embodiments, this may also be performed by AI/HW Resource Manager 301 of Gate and Switch 300 of FIG. 3, the state and configuration table may be Table 307 of FIG. 3, and the load distributor to which the additional resources may be exposed, thus allowing ANN training data traffic to be sent to them, may be Load Distributor 305 of Gate and Switch 300 of FIG. 3. From block 545, process 500 may proceed to block 560, where it may terminate.

However, if the determination is "Down" at query block 535, and computing resources are to be removed from those assigned to the ANN, then process flow may proceed to block 550, where the example apparatus may collect a current version of the ANN, i.e., the delta-ANN, from each of the computing resources to be removed from servicing the ANN. In embodiments, this may be performed by the AI/HW Resource Manager 301 component of the example Gate and Switch 300 block of FIG. 3.

From block 550, process 500 may proceed to block 555, where it may send the current versions to the ANN accumulator, and register the identified additional computing resources with a load distributor and update state and configuration table. In embodiments, this may also be performed by AI/HW Resource Manager 301 of Gate and Switch 300 of FIG. 3, the state and configuration table may be Table 307 of FIG. 3, and the ANN accumulator to which the delta-ANNs may be sent may be, for example, AI ANN Models Accumulator 303 of Gate and Switch 300 of FIG. 3. As noted above, in embodiments, when this occurs, AI ANN Models Accumulator 303 may include an access interface by which software can access the current accumulated or aggregated model, and proceed to integrate it with other delta-ANNs running on computing resources still servicing the ANN. Finally, from block 555, process 500 may proceed to block 561, where it may terminate.

Figure 6:
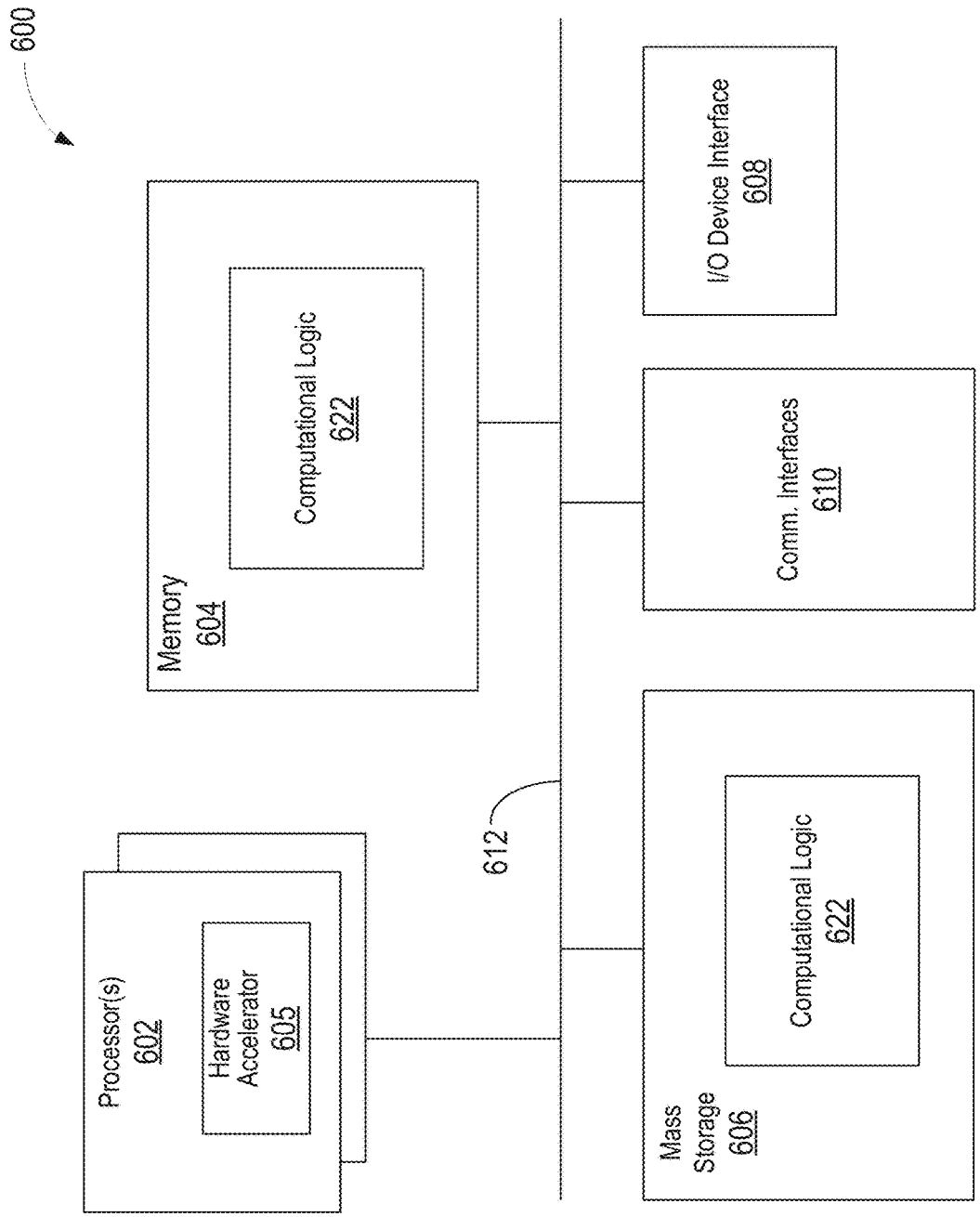
FIG. 6 illustrates a block diagram of an example computer device suitable for practicing the present disclosure, in accordance with various embodiments.

Referring now to FIG. 6 wherein a block diagram of a computer device suitable for practicing the present disclosure, in accordance with various embodiments, is illustrated. As shown, computer device 600 may include one or more processors 602, memory controller 603, and system memory 604. Each processor 602 may include one or more processor cores, and hardware accelerator 605. An example of hardware accelerator 605 may include, but is not limited to, programmed field programmable gate arrays (FPGA). In embodiments, processor 602 may also include a memory controller (not shown). In embodiments, system memory 604 may include any known volatile or non-volatile memory.

Additionally, computer device 600 may include mass storage device(s) 606 (such as solid state drives), input/output device interface 608 (to interface with various input/output devices, such as, mouse, cursor control, display device (including touch sensitive screen), and so forth) and communication interfaces 610 (such as network interface cards, modems and so forth). In embodiments, communication interfaces 610 may support wired or wireless communication, including near field communication. The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage device(s) 606 may be employed to store a working copy and a permanent copy of the executable code of the programming instructions of an operating system, one or more applications, and/or various software implemented components of Gateway and Switch block 300, Load Distributor 305, AI Training Traffic Monitor 302, AI Traffic Predictor 306, AI/HW Resource Manager 301, AI ANN Models Accumulator 303, Configuration and Management Module 304, AI Appliances 351 through 351C and HFI 352 of FIG. 3, collectively referred to as computing logic 622. The programming instructions implementing computing logic 622 may comprise assembler instructions supported by processor(s) 602 or high-level languages, such as, for example, C, that can be compiled into such instructions. In embodiments, some of computing logic may be implemented in hardware accelerator 605. In embodiments, part of computational logic 622, e.g., a portion of the computational logic 622 associated with the runtime environment of the compiler may be implemented in hardware accelerator 605.

The permanent copy of the executable code of the programming instructions or the bit streams for configuring hardware accelerator 605 may be placed into permanent mass storage device(s) 606 and/or hardware accelerator 605 in the factory, or in the field, through, for example, a distribution medium (not shown), such as a compact disc (CD), or through communication interface 610 (from a distribution server (not shown)). While for ease of understanding, the compiler and the hardware accelerator that executes the generated code that incorporate the predicate computation teaching of the present disclosure to increase the pipelining and/or parallel execution of nested loops are shown as being located on the same computing device, in alternate embodiments, the compiler and the hardware accelerator may be located on different computing devices.

The number, capability and/or capacity of these elements 610-612 may vary, depending on the intended use of example computer device 600, e.g., whether example computer device 600 is a smartphone, tablet, ultrabook, a laptop, a server, a set-top box, a game console, a camera, and so forth. The constitutions of these elements 610-612 are otherwise known, and accordingly will not be further described.

Figure 7:
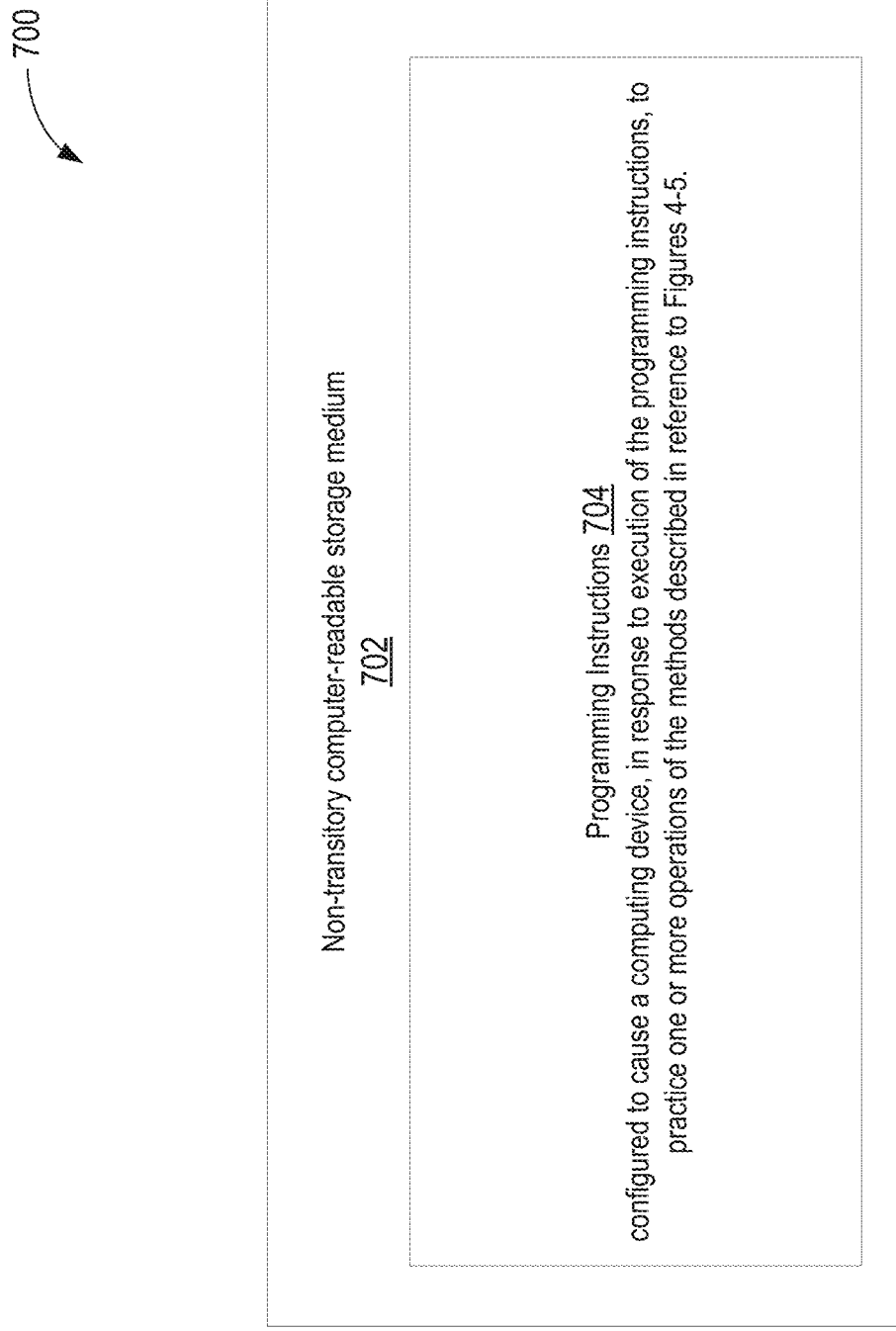
FIG. 7 illustrates an example computer-readable storage medium having instructions configured to practice aspects of the processes of FIGS. 4 and 5, in accordance with various embodiments.

FIG. 7 illustrates an example computer-readable storage medium having instructions configured to implement all (or portion of) software implementations of Gateway and Switch block 300, Load Distributor 305, AI Training Traffic Monitor 302, AI Traffic Predictor 306, AI/HW Resource Manager 301, AI ANN Models Accumulator 303, Configuration and Management Module 304, AI Appliances 351 through 351C and HFI 352 of FIG. 3, and/or practice (aspects of) processes 400 of FIG. 4, and 500 of FIG. 5, earlier described, in accordance with various embodiments. As illustrated, computer-readable storage medium 702 may include the executable code of a number of programming instructions or bit streams 704. Executable code of programming instructions (or bit streams) 704 may be configured to enable a device, e.g., computer device 600, in response to execution of the executable code/programming instructions (or operation of an encoded hardware accelerator 675), to perform (aspects of) process 500 of FIG. 5 and process 600 of FIG. 6. In alternate embodiments, executable code/programming instructions/bit streams 704 may be disposed on multiple non-transitory computer-readable storage medium 702 instead. In embodiments, computer-readable storage medium 702 may be non-transitory. In still other embodiments, executable code/programming instructions 704 may be encoded in transitory computer readable medium, such as signals.

Referring back to FIG. 6, for one embodiment, at least one of processors 602 may be packaged together with a computer-readable storage medium having some or all of computing logic 622 (in lieu of storing in system memory 604 and/or mass storage device 606) configured to practice all or selected ones of the operations earlier described with reference to FIGS. 5 and 6. For one embodiment, at least one of processors 602 may be packaged together with a computer-readable storage medium having some or all of computing logic 622 to form a System in Package (SiP). For one embodiment, at least one of processors 602 may be integrated on the same die with a computer-readable storage medium having some or all of computing logic 622. For one embodiment, at least one of processors 602 may be packaged together with a computer-readable storage medium having some or all of computing logic 622 to form a System on Chip (SoC). For at least one embodiment, the SoC may be utilized in, e.g., but not limited to, a hybrid computing tablet/laptop.

As noted above, in embodiments, an example apparatus may receive in real time model training data from one or more sources to train one or more ANNs on one or more Edge Cloud Appliances or simply, edge devices.

In embodiments, the one or more sources of model training data may be several IoT devices. Similarly, in alternate embodiments, the one or more edge devices may also be several IoT devices, and these IoT devices may be networked in an ad hoc manner. In still alternate embodiments, both the one or more sources of model training data, and the one or more edge devices, may be several IoT devices networked in an ad hoc manner. Thus, in such latter embodiments, the one or more example edge devices 351 through 351C, as shown in FIG. 3 may not be co-located, and may be networked in an ad hoc manner.

Similarly, continuing with reference to FIG. 3, each of Shopping and Payments 365, Smart Transportation 370, and Personal Devices 375, may comprise several IoT devices networked in an ad hoc manner to supply training data to one or more of ANNs ANN0 and ANN1. For example, Shopping and Payments 365 source of model training data may include one or several Shopping and Payments 365 IoT devices disposed in a shopping mall or the like, or a defined area of a city core shopping district. In embodiments, they may all be networked in an ad hoc manner. They may, for example, all acquire data to train one or more models. For example, the one or more models may track shopping habits by store type, by genre of goods, by season, by time spent at a given display or display type, to measure which customers enter a given store as a function of how long they have been in the mall or defined shopping area, or, for example, as to conversion rates of customers looking at a window display who actually enter the store whose window it is, or by time of day. Thus, as a day progresses, more shops may open, and their IoT devices may join the ad hoc network, and similarly, during the course of a day, some IoT devices that had joined, may disconnect form the ad hoc network.

Similar ad hoc networks of IoT devices may provide model training data of the Smart Transportation 370 type.

In parallel fashion, the computing resources to receive the model training data and then train actual ANNs, may also comprise one or more ad hoc networks of IoT devices. Thus, continuing with reference to FIG. 3, in embodiments, each virtual AI Appliance managed by an example apparatus, such as Gateway and Switch 300, where such virtual AI appliances, for example, may include Virtual AI Appliance ANN0 and Virtual AI Appliance ANN1, may be implemented as one or more IoT devices networked in an ad hoc manner. IoT devices, and example IoT device networks, are next described in detail.

It is here noted that IoT devices are physical objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

In the following description, methods, configurations, and related apparatuses are disclosed for the training artificial intelligence (AI) models in an IoT device interconnection setting.

Figure 8:
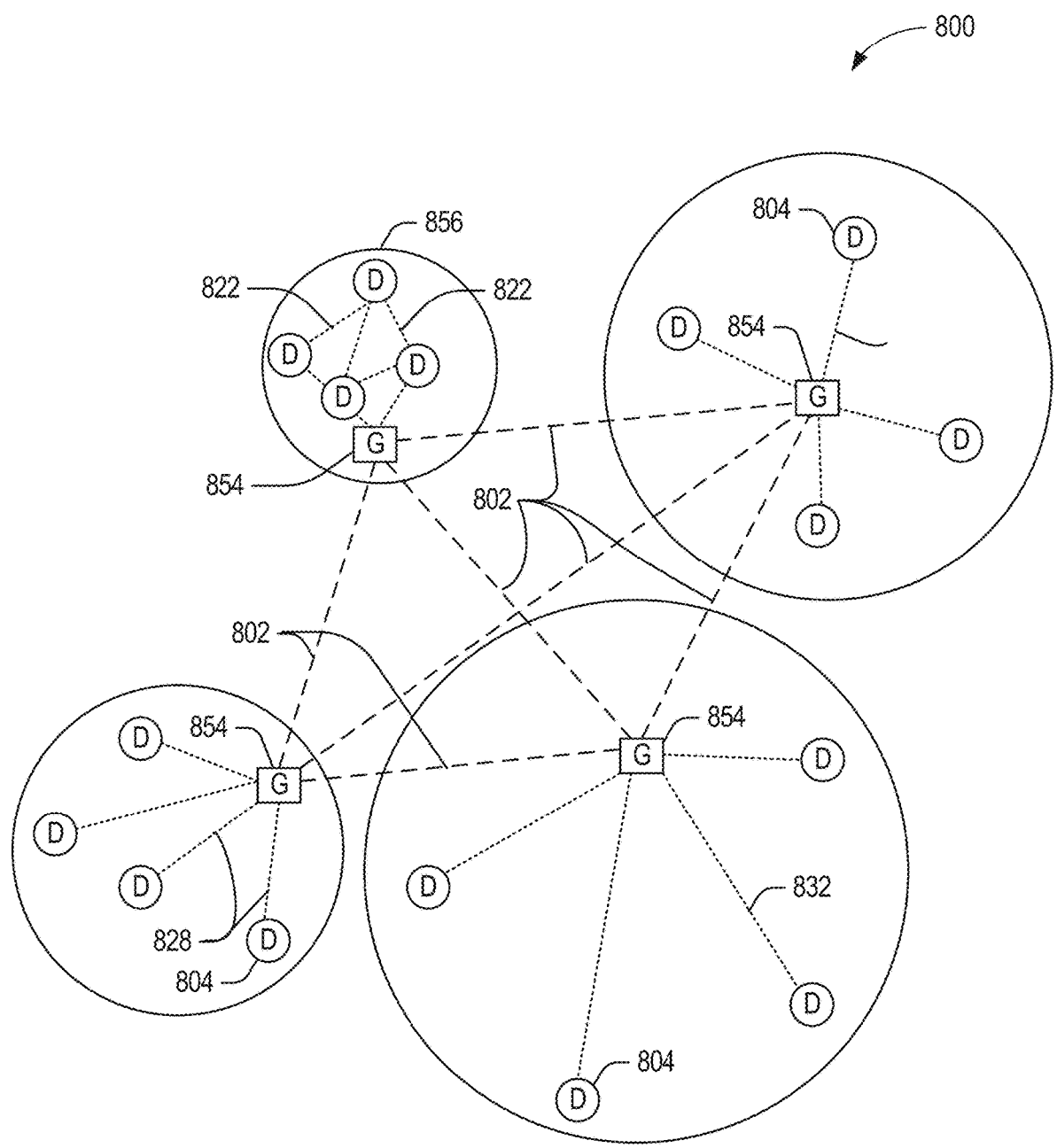
FIG. 8 illustrates an domain topology for respective internet-of-things (IoT) networks coupled through links to respective gateways, according to an example.

FIG. 8 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 9:
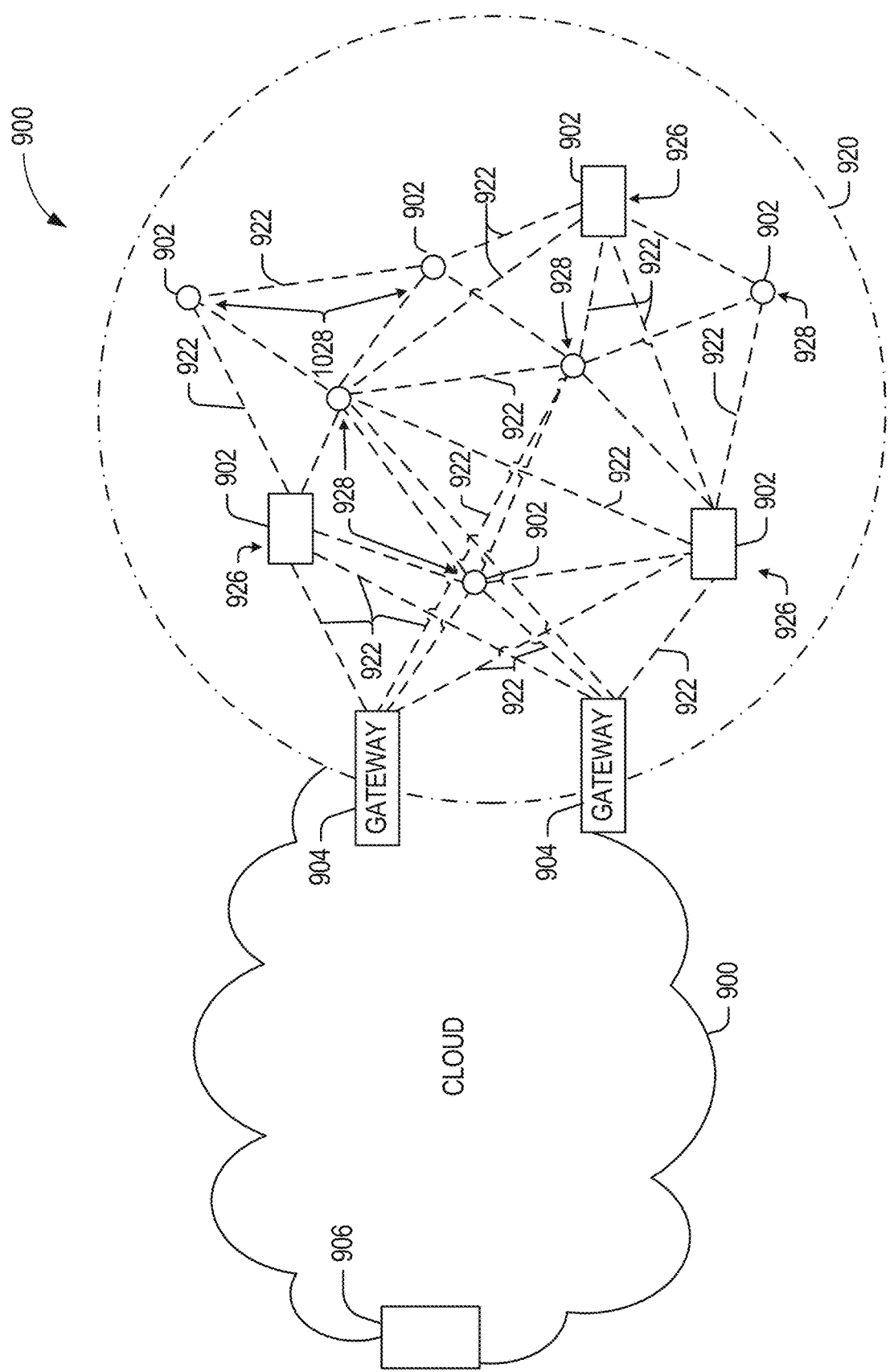
FIG. 9 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 8 and 9, present a number of new challenges in a heterogeneous network of connectivity comprising a combination of wired and wireless technologies.

FIG. 8 specifically provides a simplified drawing of a domain topology that may be used for a number of internet-of-things (IoT) networks comprising IoT devices 804, with the IoT networks 856, 858, 860, 862, coupled through backbone links 802 to respective gateways 854. For example, a number of IoT devices 804 may communicate with a gateway 854, and with each other through the gateway 854. To simplify the drawing, not every IoT device 804, or communications link (e.g., link 816, 822, 828, or 832) is labeled. The backbone links 802 may include any number of wired or wireless technologies, including optical networks, and may be part of a local area network (LAN), a wide area network (WAN), or the Internet. Additionally, such communication links facilitate optical signal paths among both IoT devices 804 and gateways 854, including the use of MUXing/deMUXing components that facilitate interconnection of the various devices.

The network topology may include any number of types of IoT networks, such as a mesh network provided with the network 856 using Bluetooth low energy (BLE) links 822. Other types of IoT networks that may be present include a wireless local area network (WLAN) network 858 used to communicate with IoT devices 804 through IEEE 802.11 (Wi-Fi®) links 828, a cellular network 860 used to communicate with IoT devices 804 through an LTE/LTE-A (4G) or 5G cellular network, and a low-power wide area (LPWA) network 862, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 804, such as over the backbone links 802, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 856, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 858, for instance, may use systems that perform standards conversion to provide multi-standard connectivity, enabling IoT devices 804 using different protocols to communicate. Further systems may provide seamless interconnectivity across a multi-standard infrastructure comprising visible Internet resources and hidden Internet resources.

Communications in the cellular network 860, for instance, may be enhanced by systems that offload data, extend communications to more remote devices, or both. The LPWA network 862 may include systems that perform non-Internet protocol (IP) to IP interconnections, addressing, and routing. Further, each of the IoT devices 804 may include the appropriate transceiver for wide area communications with that device. Further, each IoT device 804 may include other transceivers for communications using additional protocols and frequencies. This is discussed further with respect to the communication environment and hardware of an IoT processing device depicted in FIGS. 10 and 11, and described below.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 9 below.

FIG. 9 illustrates a cloud computing network in communication with a mesh network of IoT devices (devices 902) operating as a fog device at the edge of the cloud computing network. The mesh network of IoT devices may be termed a fog 920, operating at the edge of the cloud 900. To simplify the diagram, not every IoT device 902 is labeled.

The fog 920 may be considered to be a massively interconnected network wherein a number of IoT devices 902 are in communications with each other, for example, by radio links 922. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 902 are shown in this example, gateways 904, data aggregators 926, and sensors 928, although any combinations of IoT devices 902 and functionality may be used. The gateways 904 may be edge devices that provide communications between the cloud 900 and the fog 920, and may also provide the backend process function for data obtained from sensors 928, such as motion data, flow data, temperature data, and the like. The data aggregators 926 may collect data from any number of the sensors 928, and perform the back end processing function for the analysis. The results, raw data, or both may be passed along to the cloud 900 through the gateways 904. The sensors 928 may be full IoT devices 902, for example, capable of both collecting data and processing the data. In some cases, the sensors 928 may be more limited in functionality, for example, collecting the data and allowing the data aggregators 926 or gateways 904 to process the data.

Communications from any IoT device 902 may be passed along a convenient path (e.g., a most convenient path) between any of the IoT devices 902 to reach the gateways 904. In these networks, the number of interconnections provide substantial redundancy, allowing communications to be maintained, even with the loss of a number of IoT devices 902. Further, the use of a mesh network may allow IoT devices 902 that are very low power or located at a distance from infrastructure to be used, as the range to connect to another IoT device 902 may be much less than the range to connect to the gateways 904.

The fog 920 provided from these IoT devices 902 may be presented to devices in the cloud 900, such as a server 906, as a single device located at the edge of the cloud 900, e.g., a fog device. In this example, the alerts coming from the fog device may be sent without being identified as coming from a specific IoT device 902 within the fog 920. In this fashion, the fog 920 may be considered a distributed platform that provides computing and storage resources to perform processing or data-intensive tasks such as data analytics, data aggregation, and machine-learning, among others.

In some examples, the IoT devices 902 may be configured using an imperative programming style, e.g., with each IoT device 902 having a specific function and communication partners. However, the IoT devices 902 forming the fog device may be configured in a declarative programming style, allowing the IoT devices 902 to reconfigure their operations and communications, such as to determine needed resources in response to conditions, queries, and device failures. As an example, a query from a user located at a server 906 about the operations of a subset of equipment monitored by the IoT devices 902 may result in the fog 920 device selecting the IoT devices 902, such as particular sensors 928, needed to answer the query. The data from these sensors 928 may then be aggregated and analyzed by any combination of the sensors 928, data aggregators 926, or gateways 904, before being sent on by the fog 920 device to the server 906 to answer the query. In this example, IoT devices 902 in the fog 920 may select the sensors 928 used based on the query, such as adding data from flow sensors or temperature sensors. Further, if some of the IoT devices 902 are not operational, other IoT devices 902 in the fog 920 device may provide analogous data, if available.

In other examples, the operations and functionality described above with reference to FIGS. 1 to 7 may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 10:
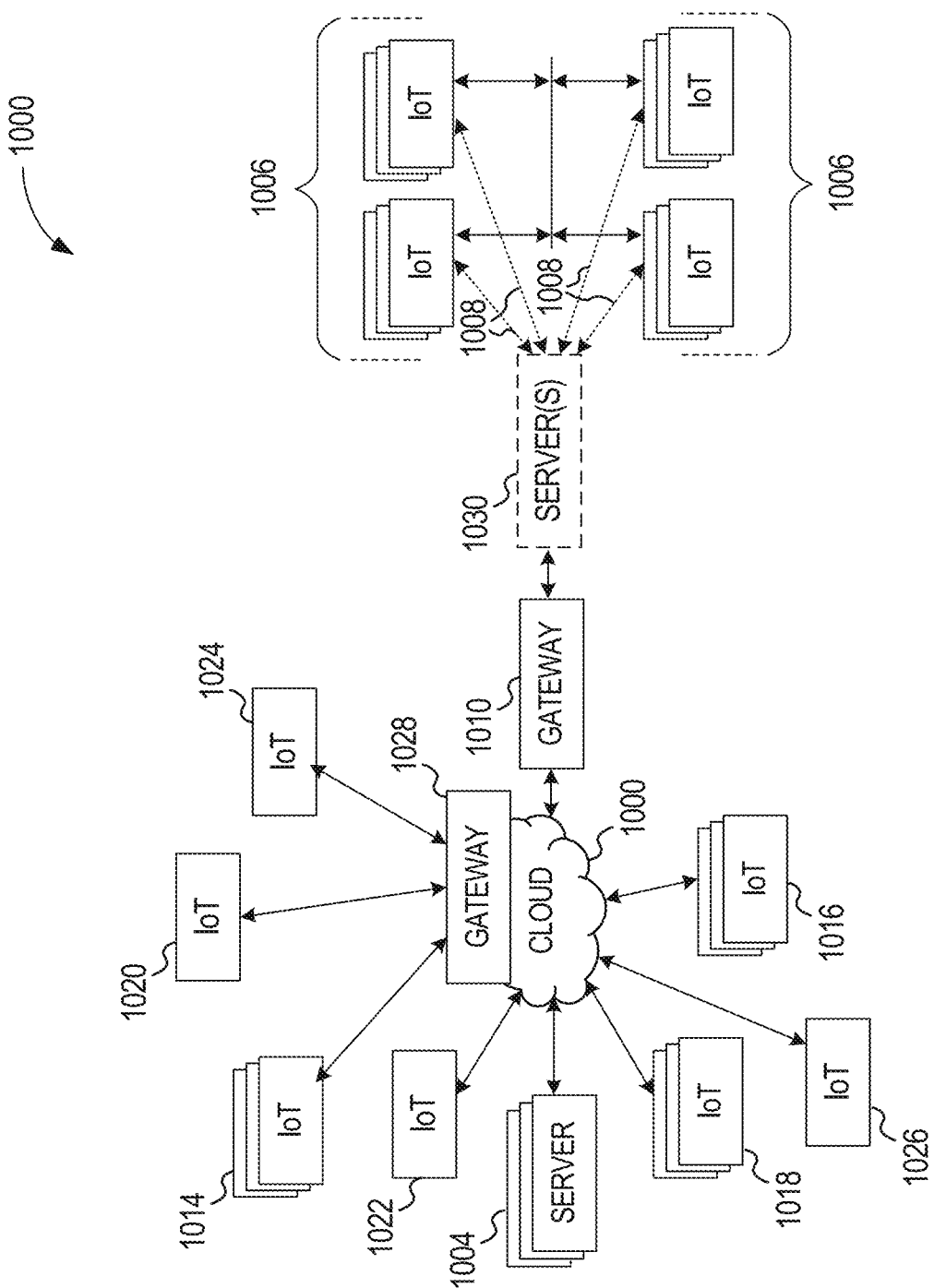
FIG. 10 illustrates a block diagram of a network illustrating communications among a number of IoT devices, according to an example.

FIG. 10 illustrates a drawing of a cloud computing network, or cloud 1000, in communication with a number of Internet of Things (IoT) devices. The cloud 1000 may represent the Internet, or may be a local area network (LAN), or a wide area network (WAN), such as a proprietary network for a company. The IoT devices may include any number of different types of devices, grouped in various combinations. For example, a traffic control group 1006 may include IoT devices along streets in a city. These IoT devices may include stoplights, traffic flow monitors, cameras, weather sensors, and the like. The traffic control group 1006, or other subgroups, may be in communication with the cloud 1000 through wired or wireless links 1008, such as LPWA links, optical links, and the like. Further, a wired or wireless sub-network 1012 may allow the IoT devices to communicate with each other, such as through a local area network, a wireless local area network, and the like. The IoT devices may use another device, such as a gateway 1010 or 1028 to communicate with remote locations such as the cloud 1000; the IoT devices may also use one or more servers 1030 to facilitate communication with the cloud 1000 or with the gateway 1010. For example, the one or more servers 1030 may operate as an intermediate network node to support a local edge cloud or fog implementation among a local area network. Further, the gateway 1028 that is depicted may operate in a cloud-to-gateway-to-many edge devices configuration, such as with the various IoT devices 1014, 1020, 1024 being constrained or dynamic to an assignment and use of resources in the cloud 1000.

Other example groups of IoT devices may include remote weather stations 1014, local information terminals 1016, alarm systems 1018, automated teller machines 1020, alarm panels 1022, or moving vehicles, such as emergency vehicles 1024 or other vehicles 1026, among many others. Each of these IoT devices may be in communication with other IoT devices, with servers 1004, with another IoT fog device or system (not shown, but depicted in FIG. 9), or a combination therein. The groups of IoT devices may be deployed in various residential, commercial, and industrial settings (including in both private or public environments).

As can be seen from FIG. 10, a large number of IoT devices may be communicating through the cloud 1000. This may allow different IoT devices to request or provide information to other devices autonomously. For example, a group of IoT devices (e.g., the traffic control group 1006) may request a current weather forecast from a group of remote weather stations 1014, which may provide the forecast without human intervention. Further, an emergency vehicle 1024 may be alerted by an automated teller machine 1020 that a burglary is in progress. As the emergency vehicle 1024 proceeds towards the automated teller machine 1020, it may access the traffic control group 1006 to request clearance to the location, for example, by lights turning red to block cross traffic at an intersection in sufficient time for the emergency vehicle 1024 to have unimpeded access to the intersection.

Clusters of IoT devices, such as the remote weather stations 1014 or the traffic control group 1006, may be equipped to communicate with other IoT devices as well as with the cloud 1000. This may allow the IoT devices to form an ad-hoc network between the devices, allowing them to function as a single device, which may be termed a fog device or system (e.g., as described above with reference to FIG. 8).

Figure 11:
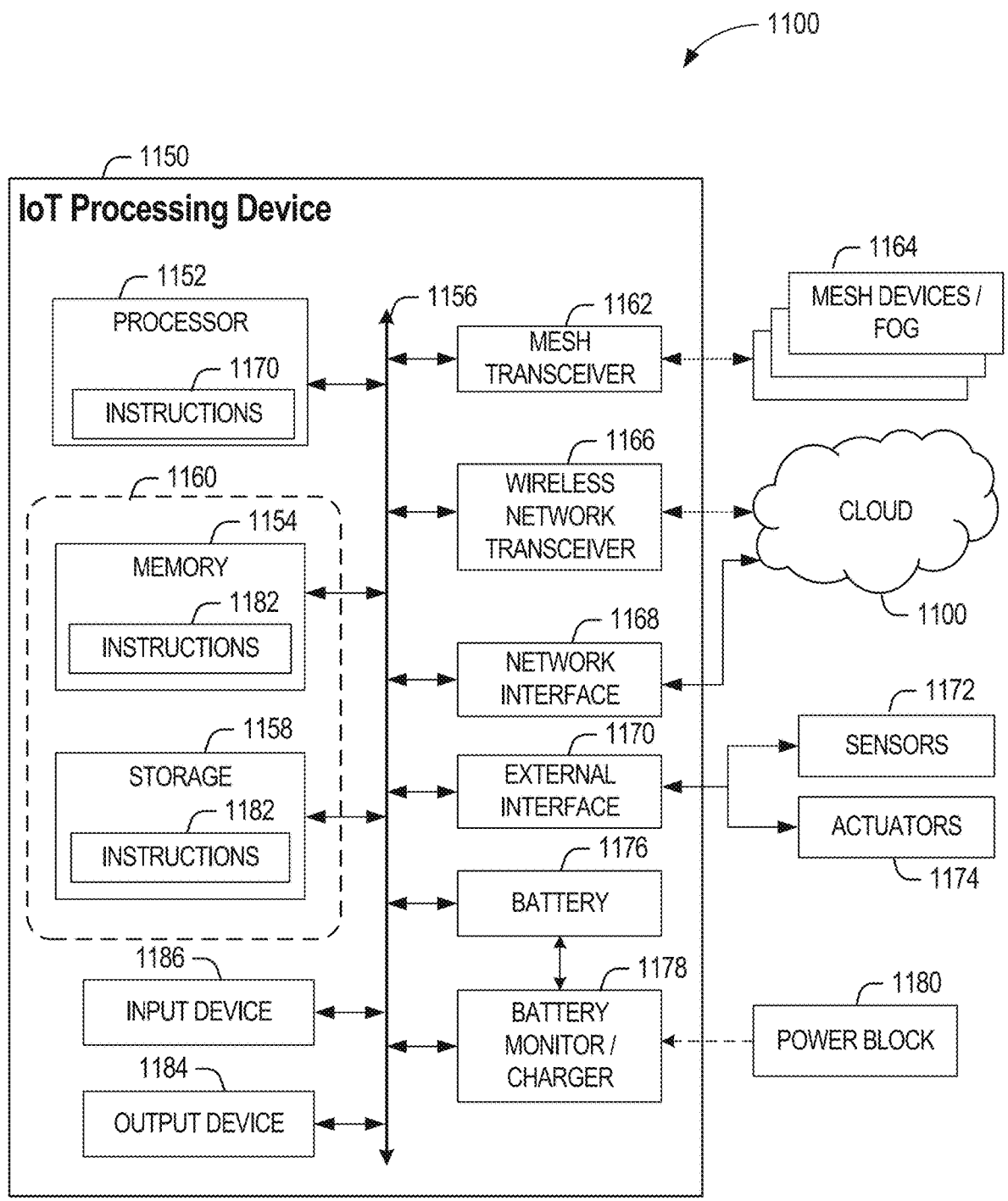
FIG. 11 illustrates a block diagram for an example IoT processing system architecture upon which any one or more of the techniques (e.g., operations, processes, methods, and methodologies) discussed herein may be performed, according to an example.

FIG. 11, next described, is a block diagram of an example of components that may be present in an IoT device 1150 for implementing the techniques described herein. The IoT device 1150 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1150, or as components otherwise incorporated within a chassis of a larger system. Additionally, the block diagram of FIG. 11 is intended to depict a high-level view of components of the IoT device 1150. However, some of the components shown may be omitted, additional components may be present, and different arrangement of the components shown may occur in other implementations.

The IoT device 1150 may include a processor 1152, which may be a microprocessor, a multi-core processor, a multithreaded processor, an ultra-low voltage processor, an embedded processor, or other known processing element. The processor 1152 may be a part of a system on a chip (SoC) in which the processor 1152 and other components are formed into a single integrated circuit, or a single package, such as the Edison™ or Galileo™ SoC boards from Intel. As an example, the processor 1152 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1152 may communicate with a system memory 1154 over an interconnect 1156 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1158 may also couple to the processor 1152 via the interconnect 1156. In an example the storage 1158 may be implemented via a solid state disk drive (SSDD). Other devices that may be used for the storage 1158 include flash memory cards, such as SD cards, microSD cards, xD picture cards, and the like, and USB flash drives. In low power implementations, the storage 1158 may be on-die memory or registers associated with the processor 1152. However, in some examples, the storage 1158 may be implemented using a micro hard disk drive (HDD). Further, any number of new technologies may be used for the storage 1158 in addition to, or instead of, the technologies described, such resistance change memories, phase change memories, holographic memories, or chemical memories, among others.

The components may communicate over the interconnect 1156. The interconnect 1156 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1156 may be a proprietary bus, for example, used in a SoC based system. Other bus systems may be included, such as an I2C interface, an SPI interface, point to point interfaces, and a power bus, among others.

The interconnect 1156 may couple the processor 1152 to a mesh transceiver 1162, for communications with other mesh devices 1164. The mesh transceiver 1162 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1164. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1162 may communicate using multiple standards or radios for communications at different range. For example, the IoT device 1150 may communicate with close devices, e.g., within about 10 meters, using a local transceiver based on BLE, or another low power radio, to save power. More distant mesh devices 1164, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1166 may be included to communicate with devices or services in the cloud 1100 via local or wide area network protocols. The wireless network transceiver 1166 may be a LPWA transceiver that follows the IEEE 802.15.4, or IEEE 802.15.4g standards, among others. The IoT device 1150 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1162 and wireless network transceiver 1166, as described herein. For example, the radio transceivers 1162 and 1166 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1162 and 1166 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1166, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1168 may be included to provide a wired communication to the cloud 1100 or to other devices, such as the mesh devices 1164. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional MC 1168 may be included to allow connect to a second network, for example, a NIC 1168 providing communications to the cloud over Ethernet, and a second NIC 1168 providing communications to other devices over another type of network.

The interconnect 1156 may couple the processor 1152 to an external interface 1170 that is used to connect external devices or subsystems. The external devices may include sensors 1172, such as accelerometers, level sensors, flow sensors, optical light sensors, camera sensors, temperature sensors, a global positioning system (GPS) sensors, pressure sensors, barometric pressure sensors, and the like. The external interface 1170 further may be used to connect the IoT device 1150 to actuators 1174, such as power switches, valve actuators, an audible sound generator, a visual warning device, and the like.

In some optional examples, various input/output (I/O) devices may be present within, or connected to, the IoT device 1150. For example, a display or other output device 1184 may be included to show information, such as sensor readings or actuator position. An input device 1186, such as a touch screen or keypad may be included to accept input. An output device 1184 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1150.

A battery 1176 may power the IoT device 1150, although in examples in which the IoT device 1150 is mounted in a fixed location, it may have a power supply coupled to an electrical grid. The battery 1176 may be a lithium ion battery, or a metal-air battery, such as a zinc-air battery, an aluminum-air battery, a lithium-air battery, and the like.

A battery monitor/charger 1178 may be included in the IoT device 1150 to track the state of charge (SoCh) of the battery 1176. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1178 may communicate the information on the battery 1176 to the processor 1152 over the interconnect 1156. The battery monitor/charger 1178 may also include an analog-to-digital (ADC) convertor that allows the processor 1152 to directly monitor the voltage of the battery 1176 or the current flow from the battery 1176. The battery parameters may be used to determine actions that the IoT device 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the IoT device 1150. A wireless battery charging circuit, such as an LTC4020 chip from Linear Technologies of Milpitas, Calif., among others, may be included in the battery monitor/charger 1178. The specific charging circuits chosen depend on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1158 may include instructions 1182 in the form of software, firmware, or hardware commands to implement the techniques described herein. Although such instructions 1182 are shown as code blocks included in the memory 1154 and the storage 1158, it may be understood that any of the code blocks may be replaced with hardwired circuits, for example, built into an application specific integrated circuit (ASIC).

In an example, the instructions 1182 provided via the memory 1154, the storage 1158, or the processor 1152 may be embodied as a non-transitory, machine readable medium 1160 including code to direct the processor 1152 to perform electronic operations in the IoT device 1150. The processor 1152 may access the non-transitory, machine readable medium 1160 over the interconnect 1156. For instance, the non-transitory, machine readable medium 1160 may be embodied by devices described for the storage medium 702 of FIG. 7, described above, or may include specific storage units such as optical disks, flash drives, or any number of other hardware devices. The non-transitory, machine readable medium 1160 may include instructions to direct the processor 1152 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Illustrative examples of the technologies disclosed herein are provided below. Each of the following non-limiting examples may stand on its own, or may be combined in any permutation or combination with any one or more of the other examples provided below or throughout the present disclosure.

EXAMPLES

Example 1 may include an apparatus for training artificial intelligence (AI) models, comprising: an input interface to receive in real time model training data from one or more sources to train one or more artificial neural networks (ANNs) associated with the one or more sources, each of the one or more sources associated with at least one of the ANNs; a load distributor coupled to the input interface to distribute in real time the model training data for the one or more ANNs to one or more AI appliances; and a resource manager coupled to the load distributor to dynamically assign one or more computing resources on ones of the AI appliances to each of the ANNs in view of amounts of the training data received in real time from the one or more sources for their associated ANNs.

Example 2 may include the apparatus of example 1, and/or any other example herein, wherein the computing resources include one or more processors or portions of processors disposed on the one or more AI appliances.

Example 3 may include the apparatus of example 2, and/or any other example herein, wherein the computing resources assigned to an ANN include multiple processors and training of the ANN is partitioned between the multiple processors.

Example 4 may include the apparatus of example 1, and/or any other example herein, wherein the apparatus is disposed in one of an edge gateway or switch of a network.

Example 5 may include the apparatus of example 1, and/or any other example herein, wherein the one or more sources of model training data include Internet of Things (IoT) devices or edge clients.

Example 6 may include the apparatus of example 1, and/or any other example herein, further comprising a client interface, to receive registration data from the one or more sources, including: ANNs that they send data for, and details of construction for each ANN to be registered.

Example 7 may include the apparatus of example 1, and/or any other example herein, further comprising a traffic predictor to decide whether to increase or decrease the computing resources assigned to an ANN, based, at least in part, on the amount of training data received in real time for the ANN.

Example 8 may include the apparatus of example 7, and/or any other example herein, wherein the traffic predictor decides whether to increase or decrease the computing resources based, at least in part, on a lookup table that correlates a level of resources with a level of training data received in real time for the ANN.

Example 9 may include the apparatus of example 8, and/or any other example herein, wherein the traffic predictor decides whether to increase or decrease the computing resources based on an artificial intelligence based model that predicts future traffic volume for the ANN.

Example 10 may include the apparatus of example 7, and/or any other example herein, further comprising a traffic monitor, coupled to the input interface and the traffic predictor, to monitor traffic volume from all of the sources associated with an ANN.

Example 11 may include the apparatus of example 7, and/or any other example herein, the resource manager further to scale up or scale down the computing resources assigned to an ANN in response to directions received from a traffic predictor.

Example 12 may include the apparatus of example 1, and/or any other example herein, wherein the resource manager, prior to a scale up of computing resources to be assigned to an ANN, is further to identify additional available computing resources and register them with the load distributor.

Example 13 may include the apparatus of example 1, and/or any other example herein, further comprising an ANN accumulator, coupled to the resource manager, to periodically collect versions of an ANN as trained on each of the computing resources assigned to the ANN, combine them into an composite version of the ANN, and store the composite version.

Example 14 may include the apparatus of example 13, and/or any other example herein, wherein the resource manager, prior to a scale down of computing resources that are assigned to an ANN, is further to collect a current version of the ANN from each of the computing resources to be removed and send the current versions to the ANN accumulator.

Example 15 may include the apparatus of example 1, and/or any other example herein, wherein the one or more AI appliances are provided in a chassis, and coupled to a hardware fabric interface (HFI), to provide an interface to tunnel communications between each AI appliance and the load distributor.

Example 16 may include the apparatus of claim 1, and/or any other example herein, wherein the one or more AI appliances are provided in a chassis, and coupled to a network interconnect car (NIC), to provide an interface to tunnel communications between each AI appliance and the load distributor.

Example 17 may include the apparatus of any one of examples 1-3, and/or any other example herein, wherein the model training data includes one or more of shopping and payments data, smart transportation data, or gaming related data from personal devices.

Example 18 may include one or more non-transitory computer-readable storage media comprising a plurality of instructions that in response to being executed cause a network gateway device, to: receive in real time model training data from one or more sources to train one or more artificial neural networks (ANNs) associated with the one or more sources, each of the one or more sources associated with at least one of the ANNs; distribute in real time the model training data for the one or more ANNs to one or more AI appliances; and dynamically assign one or more computing resources on ones of the AI appliances to each of the ANNs in view of amounts of the training data received in real time from the one or more sources for their associated ANNs.

Example 19 may include the one or more non-transitory computer-readable storage media of example 18, and/or any other example herein, wherein the computing resources include one or more processors or portions of processors disposed on the one or more AI appliances.

Example 20 may include the one or more non-transitory computer-readable storage media of example 19, and/or any other example herein, wherein the computing resources assigned to an ANN include multiple processors and further comprising instructions that, when executed, cause the network gateway device to partition the training of the ANN between the multiple processors.

Example 21 may include the one or more non-transitory computer-readable storage media of any one of examples 18-20, and/or any other example herein, wherein the one or more sources of model training data include Internet of Things (IoT) devices or edge clients.

Example 22 may include the one or more non-transitory computer-readable storage media of any one of examples 18-20, and/or any other example herein, further comprising instructions that, when executed, cause the network gateway device to: receive registration data from the one or more sources, including: ANNs that they send data for, and details of construction for each ANN to be registered.

Example 23 may include the one or more non-transitory computer-readable storage media of any one of examples 18-20, and/or any other example herein, further comprising instructions that, when executed, cause the network gateway device to: predict training data traffic to decide whether to increase or decrease the computing resources assigned to an ANN, based, at least in part, on the amount of training data received in real time for the ANN.

Example 24 may include the one or more non-transitory computer-readable storage media of example 23, and/or any other example herein, further comprising instructions that, when executed, cause the network gateway device to: decide whether to increase or decrease the computing resources based on an artificial intelligence based model that predicts future traffic volume for the ANN.

Example 25 may include the one or more non-transitory computer-readable storage media of example 23, and/or any other example herein, further comprising instructions that, when executed, cause the network gateway device to monitor traffic volume from all of the sources associated with an ANN.

Example 26 may include the one or more non-transitory computer-readable storage media of example 23, and/or any other example herein, further comprising instructions that, when executed, cause the network gateway device to scale up or scale down the computing resources assigned to an ANN in response to predictions regarding the data traffic.

Example 27 may include the one or more non-transitory computer-readable storage media of example 26, and/or any other example herein, further comprising instructions that, when executed, cause the network gateway device to: prior to a scale up of computing resources to be assigned to an ANN, identify additional available computing resources and register them for assignment to the ANN.

Example 28 may include the one or more non-transitory computer-readable storage media of any one of examples 18-20, and/or any other example herein, further comprising instructions that, when executed, cause the network gateway device to: scale up or scale down the computing resources assigned to an ANN in response to an increase or decrease in the amount of training data received for the ANN from its one or more sources.

Example 29 may include the one or more non-transitory computer-readable storage media of any one of examples 18-20, and/or any other example herein, further comprising instructions that, when executed, cause the network gateway device to: periodically collect versions of an ANN as trained on each of the computing resources assigned to the ANN, combine them into an composite version of the ANN, and store the composite version.

Example 30 may include the one or more non-transitory computer-readable storage media of example 29, and/or any other example herein, further comprising instructions that, when executed, cause the network gateway device to: prior to a scale down of computing resources that are assigned to an ANN, collect a current version of the ANN from each of the computing resources to be removed and send the current versions to an ANN accumulator.

Example 31 may include a method of managing artificial intelligence (AI) model training data on a network gateway device, comprising: receiving in real time model training data from one or more sources to train one or more artificial neural networks (ANNs) associated with the one or more sources, each of the one or more sources associated with at least one of the ANNs; distributing in real time the model training data for the one or more ANNs to one or more AI appliances; and dynamically assigning one or more computing resources on ones of the AI appliances to each of the ANNs in view of amounts of the training data received in real time from the one or more sources for their associated ANNs.

Example 32 may include the method of example 31, and/or any other example herein, further comprising monitoring traffic volume from all of the sources associated with an ANN.

Example 33 may include the method of example 32, and/or any other example herein, further comprising deciding whether to scale up or scale down the computing resources assigned to the ANN, based, at least in part, on the aggregated traffic volume of the ANN.

Example 34 may include the method of example 31, and/or any other example herein, wherein the computing resources assigned to an ANN include multiple processors on multiple AI appliances, and further comprising partitioning the training of the ANN between the multiple processors.

Example 35 may include the method of example 34, and/or any other example herein, further comprising: periodically collecting versions of an ANN as trained on each of the computing resources assigned to the ANN; combining the versions of the ANN into an composite version of the ANN; and storing the composite version in the network gateway device.

Example 36 may include the method of example 31, and/or any other example herein, further comprising: receiving registration data from the one or more sources, including: ANNs that they send data for, and details of construction for each ANN to be registered.

Example 37 may include the method of example 31, and/or any other example herein, further comprising: predicting training data traffic to decide whether to increase or decrease the computing resources assigned to an ANN, based, at least in part, on the amount of training data received in real time for the ANN.

Example 38 may include the method of example 37, and/or any other example herein, further comprising: deciding whether to increase or decrease the computing resources based on an artificial intelligence based model that predicts future traffic volume for the ANN.

Example 39 may include the method of example 37, and/or any other example herein, further comprising: scaling up or scaling down the computing resources assigned to an ANN in response to predictions regarding the data traffic.

Example 40 may include the method of example 39, and/or any other example herein, further comprising: prior to a scale up of computing resources to be assigned to an ANN, identifying additional available computing resources and register them for assignment to the ANN.

Example 41 may include one or more non-transitory computer-readable storage media comprising a plurality of instructions that in response to being executed cause a network gateway device, to practice the method of any one of examples 31-40.

Example 42 may include an apparatus for computing, comprising: means for receiving in real time model training data from one or more sources to train one or more artificial neural networks (ANNs) associated with the one or more sources, each of the one or more sources associated with at least one of the ANNs; means for distributing in real time the model training data for the one or more ANNs to one or more AI appliances; and means for dynamically assigning one or more computing resources on ones of the AI appliances to each of the ANNs in view of amounts of the training data received in real time from the one or more sources for their associated ANNs.

Example 43 may include the apparatus for computing of example 42, and/or any other example herein, wherein the computing resources include one or more processors or portions of processors disposed on the one or more AI appliances.

Example 44 may include the apparatus for computing of example 43, and/or any other example herein, wherein the computing resources assigned to an ANN include multiple processors and further comprising instructions that, when executed, cause the network gateway device to partition the training of the ANN between the multiple processors.

Example 45 may include the apparatus for computing of any one of examples 42-44, and/or any other example herein, wherein the one or more sources of model training data include Internet of Things (IoT) devices or edge clients.

Example 46 may include the apparatus for computing of any one of examples 42-44, and/or any other example herein, further comprising: means for receiving registration data from the one or more sources, including: ANNs that they send data for, and details of construction for each ANN to be registered.

Example 47 may include the apparatus for computing of any one of examples 42-44, and/or any other example herein, further comprising: means for predicting training data traffic to decide whether to increase or decrease the computing resources assigned to an ANN, based, at least in part, on the amount of training data received in real time for the ANN.

Example 48 may include the apparatus for computing of example 47, and/or any other example herein, further comprising: means for deciding whether to increase or decrease the computing resources based on an artificial intelligence based model that predicts future traffic volume for the ANN.

Example 49 may include the apparatus for computing of example 47, and/or any other example herein, further comprising means for monitoring traffic volume from all of the sources associated with an ANN.

Example 50 may include the apparatus for computing of example 47, and/or any other example herein, further comprising means for causing the network gateway device to scale up or scale down the computing resources assigned to an ANN in response to predictions regarding the data traffic.

Example 51 may include the apparatus for computing of example 50, and/or any other example herein, further comprising: means for identifying additional available computing resources to be assigned to an ANN and means for registering them for assignment to the ANN prior to a scale up of computing resources.

Example 52 may include the apparatus for computing of any one of examples 42-44, and/or any other example herein, further comprising: means for scaling up or scaling down the computing resources assigned to an ANN in response to an increase or decrease in the amount of training data received for the ANN from its one or more sources.

Example 53 may include the apparatus for computing of any one of examples 42-44, and/or any other example herein, further comprising: means for periodically collecting versions of an ANN as trained on each of the computing resources assigned to the ANN, means for combining them into an composite version of the ANN, and means for storing the composite version.

Example 54 may include the apparatus for computing of example 53, and/or any other example herein, further comprising: means for collecting, prior to a scale down of computing resources that are assigned to an ANN, a current version of the ANN from each of the computing resources to be removed and means for sending the current versions to an ANN accumulator.

Example 55 may include the apparatus for computing of example 53, and/or any other example herein, wherein the one or more computing resources are IoT devices networked in an ad hoc manner.

Example 56 may include the apparatus for computing of example 54, and/or any other example herein, wherein the one or more computing resources are IoT devices networked in an ad hoc manner.

Example 57 may include the apparatus for computing of example 53, and/or any other example herein, wherein the one or more sources of real time model training data are IoT devices networked in an ad hoc manner.

Example 58 may include the apparatus for computing of example 54, and/or any other example herein, wherein the one or more sources of real time model training data are IoT devices networked in an ad hoc manner.

Example 59 may include the apparatus of example 1, and/or any other example herein, wherein the one or more computing resources are IoT devices networked in an ad hoc manner.

Example 60 may include the apparatus of example 1, and/or any other example herein, wherein the one or more sources of real time model training data are IoT devices networked in an ad hoc manner.

What is claimed is:

1. An apparatus for training artificial intelligence (AI) models, comprising:
    an input interface to receive in real time model training data from one or more sources to train one or more artificial neural networks (ANNs) associated with the one or more sources, each of the one or more sources associated with at least one of the ANNs;
    a load distributor coupled to the input interface to distribute in real time the model training data for the one or more ANNs to one or more AI appliances;
    a resource manager coupled to the load distributor to dynamically assign one or more computing resources on one of the AI appliances to each of the ANNs in view of amounts of the training data received in real time from the one or more sources for their associated ANNs; and
    a traffic predictor to decide whether to increase or decrease one or more computing resources assigned to at least one of the ANNs based on an artificial intelligence based model that predicts future traffic volume for the at least one of the ANNs, wherein the resource manager is to scale up or scale down the computing resources assigned to the at least one of the ANNs in response to an instruction received from the traffic predictor.

2. The apparatus of claim 1, wherein the computing resources include one or more processors or portions of processors disposed on the one or more AI appliances.

3. The apparatus of claim 2, wherein the computing resources assigned to an ANN include multiple processors and training of the ANN is partitioned between the multiple processors.

4. The apparatus of claim 1, wherein the apparatus is disposed in one of an edge gateway or switch of a network.

5. The apparatus of claim 1, wherein the one or more sources of model training data include Internet of Things (IoT) devices or edge clients.

6. The apparatus of claim 1, further comprising a client interface, to receive registration data from the one or more sources, including:
    ANNs that they send data for, and
    details of construction for each ANN to be registered.

7. The apparatus of claim 1, further comprising a traffic predictor to decide whether to increase or decrease the computing resources assigned to an ANN, based, at least in part, on the amount of training data received in real time for the ANN.

8. The apparatus of claim 7, wherein the traffic predictor decides whether to increase or decrease the computing resources based, at least in part, on a lookup table that correlates a level of resources with a level of training data received in real time for the ANN.

9. The apparatus of claim 8, wherein the traffic predictor decides whether to increase or decrease the computing resources based on an artificial intelligence based model that predicts future traffic volume for the ANN.

10. The apparatus of claim 7, further comprising a traffic monitor, coupled to the input interface and the traffic predictor, to monitor traffic volume from all of the sources associated with an ANN.

11. The apparatus of claim 1, wherein the resource manager, prior to a scale up of computing resources to be assigned to an ANN, is further to identify additional available computing resources and register them with the load distributor.

12. The apparatus of claim 1, further comprising an ANN accumulator, coupled to the resource manager, to periodically collect versions of an ANN as trained on each of the computing resources assigned to the ANN, combine them into a composite version of the ANN, and store the composite version.

13. The apparatus of claim 12, wherein the resource manager, prior to a scale down of computing resources that are assigned to an ANN, is to collect a current version of the ANN from each of the computing resources to be removed and send the current versions to the ANN accumulator.

14. The apparatus of claim 1, wherein the one or more AI appliances are provided in a chassis, and coupled to a hardware fabric interface (HFI), to provide an interface to tunnel communications between each AI appliance and the load distributor.

15. One or more non-transitory computer-readable storage media comprising a plurality of instructions that in response to being executed cause a network gateway device, to:
    receive in real time model training data from one or more sources to train one or more artificial neural networks (ANNs) associated with the one or more sources, each of the one or more sources associated with at least one of the ANNs;
    distribute in real time the model training data for the one or more ANNs to one or more AI appliances;
    dynamically assign one or more computing resources on one of the AI appliances to each of the ANNs in view of amounts of the training data received in real time from the one or more sources for their associated ANNs;
    decide whether to increase or decrease one or more computing resources assigned to at least one of the ANNs based on an artificial intelligence based model that predicts future traffic volume for the at least one of the ANNs; and
    scale up or scale down the computing resources assigned to the at least one of the ANNs in response to the determination of whether to increase or decrease the computing resources assigned to the at least one of the ANNs.

16. The one or more non-transitory computer-readable storage media of claim 15, wherein the computing resources include one or more processors or portions of processors disposed on the one or more AI appliances.

17. The one or more non-transitory computer-readable storage media of claim 16, wherein the computing resources assigned to an ANN include multiple processors and further comprising instructions that, when executed, cause the network gateway device to partition the training of the ANN between the multiple processors.

18. The one or more non-transitory computer-readable storage media of claim 15, further comprising instructions that, when executed, cause the network gateway device to:
    periodically collect versions of an ANN as trained on each of the computing resources assigned to the ANN, combine them into a composite version of the ANN, and store the composite version.

19. The one or more non-transitory computer-readable storage media of claim 18, wherein the instructions, when executed, cause the network gateway device to, prior to a scale down of computing resources that are assigned to an ANN, collect a current version of the ANN from each of the computing resources to be removed and send the current versions to an ANN accumulator.

20. A method of managing artificial intelligence (AI) model training data on a network gateway device, comprising:
- receiving in real time model training data from one or more sources to train one or more artificial neural networks (ANNs) associated with the one or more sources, each of the one or more sources associated with at least one of the ANNs;
- distributing in real time the model training data for the one or more ANNs to one or more AI appliances;
- dynamically assigning one or more computing resources on one of the AI appliances to each of the ANNs in view of amounts of the training data received in real time from the one or more sources for their associated ANNs;
- deciding whether to increase or decrease one or more computing resources assigned to at least one of the ANNs based on an artificial intelligence based model that predicts future traffic volume for the at least one of the ANNs; and
- scaling up or scaling down the compute resources assigned to the at least one of the ANNs based in response to the decision to increase or decrease of the computing resources assigned to the at least one of the ANNs.

21. The method of claim 20, further comprising:
- monitoring traffic volume from all of the sources associated with an ANN; and deciding whether to increase or decrease the computing resources assigned to the ANN, based, at least in part, on the aggregated traffic volume of the ANN.

22. The method of claim 20, wherein the computing resources assigned to an ANN include multiple processors on multiple AI appliances, and further comprising partitioning the training of the ANN between the multiple processors.

23. The method of claim 22, further comprising:
- periodically collecting versions of an ANN as trained on each of the computing resources assigned to the ANN;
- combining the versions of the ANN into a composite version of the ANN; and
- storing the composite version in the network gateway device.

* * * * *